(12) United States Patent
Sun

(10) Patent No.: US 11,155,902 B2
(45) Date of Patent: *Oct. 26, 2021

(54) HIGH STRENGTH, HOT DIP COATED, DUAL PHASE, STEEL SHEET AND METHOD OF MANUFACTURING SAME

(75) Inventor: Weiping Sun, Canton, MI (US)

(73) Assignee: NUCOR CORPORATION, Charlotte, NC (US)

( * ) Notice: Subject to any disclaimer, the term of this patent is extended or adjusted under 35 U.S.C. 154(b) by 1093 days.

This patent is subject to a terminal disclaimer.

(21) Appl. No.: 13/251,280

(22) Filed: Oct. 2, 2011

(65) Prior Publication Data

US 2012/0138194 A1 Jun. 7, 2012

Related U.S. Application Data

(60) Continuation-in-part of application No. 12/606,566, filed on Oct. 27, 2009, now abandoned, which is a
(Continued)

(51) Int. Cl.
*C22C 38/44* (2006.01)
*C21D 8/02* (2006.01)
(Continued)

(52) U.S. Cl.
CPC .......... *C22C 38/002* (2013.01); *B32B 15/013* (2013.01); *C21D 8/0205* (2013.01);
(Continued)

(58) Field of Classification Search
CPC .................... C21D 2211/005; C21D 2211/008
See application file for complete search history.

(56) References Cited

U.S. PATENT DOCUMENTS 3,837,894 A 9/1974 Tucker
4,072,543 A 2/1978 Coldren et al.
(Continued)

FOREIGN PATENT DOCUMENTS

AU 2005200300 A1 1/2005
EP 0945522 A1 9/1999
(Continued)

OTHER PUBLICATIONS

"Glossary of Metallurgical and Metalworking Terms," Metals Handbook, ASM International, 2002, p. 111.*
(Continued)

*Primary Examiner* — Vanessa T. Luk
(74) *Attorney, Agent, or Firm* — Christopher J. Knors; Moore & Van Allen PLLC

(57) ABSTRACT

A galvanized dual phase steel sheet with a martensite phase and a ferrite phase and a composition containing within the following ranges by weight: carbon from about 0.01% to about 0.18%; manganese from about 0.2% to about 3%; silicon≤about 1.2%; aluminum from about 0.01% to about 0.1%; one or both of chromium and nickel from about 0.1% to about 3.5%; calcium from about 0.0003% to about 0.01%; phosphorus≤about 0.1%; sulfur≤about 0.03%; nitrogen≤about 0.02%; molybdenum≤about 1%; one or more of niobium and titanium≤about 1%; and boron≤about 0.006% by weight; and with the balance of the composition being iron and incidental ingredients. The steel sheet may be both galvanized and galvannealed.

5 Claims, 2 Drawing Sheets

Related U.S. Application Data division of application No. 11/527,918, filed on Sep. 27, 2006, now Pat. No. 7,608,155.

(51) Int. Cl.

| | |
|---|---|
| *C22C 38/00* | (2006.01) |
| *C22C 38/04* | (2006.01) |
| *C22C 38/48* | (2006.01) |
| *C23C 2/02* | (2006.01) |
| *B32B 15/01* | (2006.01) |
| *C22C 38/46* | (2006.01) |
| *C22C 38/02* | (2006.01) |
| *C22C 38/50* | (2006.01) |
| *C22C 38/18* | (2006.01) |
| *C22C 38/06* | (2006.01) |
| *C22C 38/22* | (2006.01) |
| *C22C 38/40* | (2006.01) |
| *C23C 2/28* | (2006.01) |

(52) U.S. Cl.
CPC .......... *C21D 8/0226* (2013.01); *C21D 8/0236* (2013.01); *C22C 38/001* (2013.01); *C22C 38/02* (2013.01); *C22C 38/04* (2013.01); *C22C 38/06* (2013.01); *C22C 38/18* (2013.01); *C22C 38/22* (2013.01); *C22C 38/40* (2013.01); *C22C 38/44* (2013.01); *C22C 38/46* (2013.01); *C22C 38/48* (2013.01); *C22C 38/50* (2013.01); *C23C 2/02* (2013.01); *C23C 2/28* (2013.01); *Y10T 428/12951* (2015.01)

(56) References Cited

U.S. PATENT DOCUMENTS

| | | | |
|---|---|---|---|
| 4,361,448 A | 11/1982 | Sippola | |
| 4,376,661 A | 3/1983 | Takechi et al. | |
| 4,394,186 A | 7/1983 | Furukawa | |
| 4,398,970 A | 8/1983 | Marder | |
| 4,436,561 A | 3/1984 | Takahashi et al. | |
| 4,437,902 A | 3/1984 | Pickens et al. | |
| 4,609,410 A | 9/1986 | Hu | |
| 4,615,749 A | 10/1986 | Satoh et al. | |
| 4,708,748 A | 11/1987 | Satoh et al. | |
| 4,770,719 A | 9/1988 | Hashiguchi et al. | |
| 4,854,976 A | 8/1989 | Era et al. | |
| 5,312,493 A | 5/1994 | Masui et al. | |
| 5,328,528 A | 7/1994 | Chen | |
| 5,454,887 A | 10/1995 | Fukui | |
| 5,470,403 A | 11/1995 | Yoshinaga et al. | |
| 6,143,100 A | 11/2000 | Sun | |
| 6,210,496 B1 | 4/2001 | Takagi et al. | |
| 6,221,179 B1 | 4/2001 | Yasuhara et al. | |
| 6,296,805 B1 | 10/2001 | Laurent et al. | |
| 6,312,536 B1 | 11/2001 | Omiya | |
| 6,319,338 B1* | 11/2001 | Kawano | C21D 8/02 148/320 |
| 6,423,426 B1 | 7/2002 | Koboyashi et al. | |
| 6,440,584 B1 | 8/2002 | Nagataki et al. | |
| 6,537,394 B1 | 3/2003 | Osawa et al. | |
| 6,544,354 B1* | 4/2003 | Kawano | C21D 8/0226 148/320 |
| 6,641,931 B2 | 11/2003 | Claessens | |
| 6,666,932 B2 | 12/2003 | Funakawa et al. | |
| 6,673,171 B2 | 1/2004 | Hlady | |
| 6,676,774 B2 | 1/2004 | Matsuoka et al. | |
| 6,702,904 B2 | 3/2004 | Kami et al. | |
| 6,706,419 B2 | 3/2004 | Yoshinaga et al. | |
| 6,709,535 B2 | 3/2004 | Utsumi et al. | |
| 6,726,782 B2 | 4/2004 | Nakai et al. | |
| 6,811,624 B2 | 11/2004 | Hoydick | |
| 6,814,819 B2 | 11/2004 | Matsuoka et al. | |
| 6,818,074 B2 | 11/2004 | Matsuoka et al. | |
| 6,869,691 B2 | 3/2005 | Nagataki et al. | |
| 6,982,012 B2 | 1/2006 | Normura et al. | |
| 7,090,731 B2 | 8/2006 | Kashima et al. | |
| 7,118,809 B2 | 10/2006 | Utsumi | |
| 7,311,789 B2 | 12/2007 | Hoydick | |
| 7,381,478 B2 | 6/2008 | Yokoi et al. | |
| 7,396,420 B2 | 7/2008 | Matsuoka et al. | |
| 7,442,268 B2 | 10/2008 | Sun | |
| 7,527,700 B2 | 5/2009 | Kariya et al. | |
| 7,534,312 B2 | 5/2009 | Yoshinaga et al. | |
| 7,553,380 B2 | 6/2009 | Ikeda et al. | |
| 7,608,155 B2 | 10/2009 | Sun | |
| 7,686,896 B2* | 3/2010 | Yoshida | C22C 38/12 148/320 |
| 2002/0096232 A1 | 7/2002 | Nakai et al. | |
| 2002/0197508 A1 | 12/2002 | Yoshinaga et al. | |
| 2003/0015263 A1* | 1/2003 | Kami | C21D 8/0273 148/603 |
| 2003/0041932 A1 | 3/2003 | Tosaka et al. | |
| 2003/0047256 A1 | 3/2003 | Kami et al. | |
| 2003/0084966 A1 | 5/2003 | Ikeda et al. | |
| 2003/0129444 A1* | 7/2003 | Matsuoka | C22C 38/001 428/659 |
| 2003/0221752 A1 | 12/2003 | Utsumi et al. | |
| 2004/0007297 A1 | 1/2004 | Matsuoka et al. | |
| 2004/0035500 A1 | 2/2004 | Ikeda et al. | |
| 2004/0047756 A1 | 3/2004 | Rege et al. | |
| 2004/0074573 A1 | 4/2004 | Funakawa et al. | |
| 2004/0108024 A1 | 6/2004 | Matsuoka et al. | |
| 2004/0118489 A1 | 6/2004 | Sun | |
| 2004/0211495 A1 | 10/2004 | Hoydick | |
| 2004/0238080 A1 | 12/2004 | Vandeputte et al. | |
| 2004/0238081 A1* | 12/2004 | Yoshinaga | C22C 38/02 148/603 |
| 2004/0238082 A1* | 12/2004 | Hasegawa | C22C 38/02 148/652 |
| 2005/0016644 A1 | 1/2005 | Matsuoka et al. | |
| 2005/0019601 A1 | 1/2005 | Matsuoka et al. | |
| 2005/0173031 A1* | 8/2005 | Hasegawa | C21D 8/0263 148/546 |
| 2005/0247383 A1 | 11/2005 | Utsumi et al. | |
| 2006/0144482 A1 | 7/2006 | Moulin | |
| 2006/0191612 A1 | 8/2006 | Yoshida et al. | |
| 2006/0222882 A1* | 10/2006 | Honda | B32B 15/013 428/659 |
| 2007/0003774 A1 | 1/2007 | McDaniel | |
| 2007/0037006 A1 | 2/2007 | Yokoi et al. | |
| 2007/0144633 A1 | 6/2007 | Kizu et al. | |
| 2009/0071574 A1 | 3/2009 | Sun | |
| 2009/0071575 A1 | 3/2009 | Sun | |
| 2009/0242085 A1 | 10/2009 | Ikeda et al. | |

FOREIGN PATENT DOCUMENTS

| | | | |
|---|---|---|---|
| EP | 0969112 A1 | 1/2000 | |
| EP | 1191114 A1 | 2/2001 | |
| EP | 1146132 A1 | 10/2001 | |
| EP | 1193322 A1 | 4/2002 | |
| EP | 1291448 A1 | 8/2003 | |
| EP | 1431407 A1 | 6/2004 | |
| EP | 1666622 A1 | 9/2004 | |
| EP | 1577407 A1 | 9/2005 | |
| EP | 1666623 A1 | 6/2006 | |
| JP | 54033218 | 3/1979 | |
| JP | 55100934 A | 8/1980 | |
| JP | 56013437 A | 2/1981 | |
| JP | 58058264 A | 4/1983 | |
| JP | 61045788 U | 3/1986 | |
| JP | 61045892 U | 3/1986 | |
| JP | 10251794 A | 9/1989 | |
| JP | 08246097 | 9/1996 | |
| JP | 2000239791 A | 9/2000 | |
| JP | 2000334655 A | 12/2000 | |
| JP | 2001-089811 A | 4/2001 | |
| JP | 2001220648 | 8/2001 | |
| JP | WO 03018857 A1 * | 3/2003 | ............ C21D 8/04 |
| JP | WO 2005031022 A1 * | 4/2005 | ............ C22C 38/02 |
| WO | 2004059026 A2 | 7/2004 | |

(56) References Cited

FOREIGN PATENT DOCUMENTS

| WO | WO-2004061137 A1 | * | 7/2004 | ............... C23C 2/28 |
| WO | WO2005/028693 | * | 3/2005 | ............. C22C 38/00 |
| WO | WO-2005095664 A1 | * | 10/2005 | ............... C21D 9/46 |

OTHER PUBLICATIONS

"Glossary of Metallurgical and Metalworking Terms," Metals Handbook, ASM Handbooks Online, ASM International, 2002, pp. 1, 76, 257.*

G. R. Speich, Dual-Phase Steels, Properties and Selection: Irons, Steels, and High-Performance Alloys, vol. 1, ASM Handbook, ASM International, 1990, pp. 424-429 (print version), 3 pages (online version). (Year: 1990).*

Thelning, Karl-Erik, Head of Research and Development Smedjebacken-Boxholm Stal AB, Sweden, Steel and Heat Treatment, Second Edition; Butterworths, printed in Great Britain by Mackagys of Chatham Ltd., Kent; pp. 436-437, 1984.

U.S. Steel—Automotive Center—Comparison of Mechanical Properties; http://www.usautomotive.com/auto/tech/mech_properties.htm, copyright 2005.

Gedeon, S.A., et al., Resistance Spot Welding Galvanized Steel: Part II. Mechanisms of Spot Weld Nugget Format in; Metallurgical Transactions B; vol. 17B, Dec. 1986, pp. 887-901; Manuscript submitted Aug. 15, 1985.

Malyshevskii, V.A., et al., Structural Steels; Effect of Alloying Elements and Structure on the Properties of Low-Carbon Heat-Treatable Steel; Translated from Metallovedenie I Termischeskaya Obrabotka Metallov, No. 9, pp. 5-9, Sep. 2001.

Herring, Daniel H., What Happens to Steel During Heat Treatment? Part One: Phase Transformations, Apr. 9, 2007; http://www.industrialheating.com/CDA/Articles/Column/BNP_GUID_9-5-2006_A_100000000000000083813.

The International Bureau of WIPO, International Preliminary Report on Patentability for International Application No. PCT/US2009/051461 dated Jan. 25, 2011.

The International Bureau of WIPO, International Search Report and Written Opinion of International Searching Authority for International Application No. PCT/US2009/051461 dated Mar. 8, 2010.

Mills, Kathleen, et al., Metals Handbook Ninth Edition, vol. 9, Metallography and Microstructures, Terms and Definitions, p. 11, American Society for Metals, Metals Park, Ohio, Accessed May 12, 2008.

European Patent Office, EP Standard Search Report dated Apr. 19, 2007, File No. 99/748,004.

Canadian Intellectual Property Office, Canadian Office Action dated Dec. 14, 2011 for Canadian Application No. 2564050.

* cited by examiner

HIGH STRENGTH, HOT DIP COATED, DUAL PHASE, STEEL SHEET AND METHOD OF MANUFACTURING SAME

This application is a continuation in part of U.S. patent application Ser. No. 12/606,566, filed Oct. 27, 2009, which is a divisional application of U.S. patent application Ser. No. 11/527,918, filed Sep. 27, 2006, now U.S. Pat. No. 7,608,155, the disclosures of both of which are incorporated herein by reference.

FIELD OF INVENTION

The present invention relates to a high strength, hot dip coated (galvanized and optionally galvannealed), dual phase-structured (ferrite+martensite) steel sheet product and a method of manufacturing the same. The steel sheet produced according to the present invention has one or more of excellent formability, excellent impact toughness, excellent crash resistance, or excellent weldability, and in a preferred embodiment, has one or more of excellent surface property or stable material properties under various galvanizing process conditions.

DESCRIPTION OF EMPLOYED ABBREVIATIONS

The following abbreviations are employed in here.

| ABBREVIATIONS | |
|---|---|
| Ampere | A |
| Centigrade | C. |
| Centimeter | cm |
| Compact Strip Production | CSP |
| Degree | ° |
| Fahrenheit | F. |
| Feet or Foot | ft |
| Gram | g |
| Heat Affected Zone | HAZ |
| Joule | J |
| Kilo | k |
| Pound | lb |
| Mega Pascal | MPa |
| Meter | m |
| Millimeter | mm |
| Minute | min |
| Newton | N |
| Ohm | Ω |
| Percentage | % |
| Pound | lb |
| Second | s |
| Thousand pounds per square inch | ksi |
| Micro | μ |
| Weight | wt |

BACKGROUND OF INVENTION

With ever-increasing demand for energy savings and emission reduction, more and more vehicle parts, such as automotive vehicle parts, are now being manufactured using high strength steel sheets, which are stronger and can be made thinner to reduce the vehicle mass and thus improve vehicle fuel efficiency. Increasing importance is also being placed on vehicle safety to protect a driver and passengers upon collision.

Generally, steel sheets having a high strength exhibit a high impact resistance, and thus are also more favorable. However, a problem arises in that an increase in strength of a steel sheet generally decreases its formability, and thus using such a sheet to manufacture complicated parts becomes more difficult.

A known solution to this problem is dual phase steel, which possesses microstructures of martensite islands embedded in a ferrite matrix. Due to a superior combination of high tensile strength, high elongation, continuous yielding, low yield ratio and high work hardening, dual phase steel is not only strong, but also has good formability, such as press-forming and draw-forming properties, and exhibits high crash resistance. Applications of dual phase steel sheets in the vehicle industry can thus help to improve vehicle fuel efficiency and durability, and further improve the safety of passengers.

The previous research and development in the dual phase steel sheet field have resulted in a number of methods for producing cold rolled, hot-dip coated dual phase steel sheets, many of which are summarized and reviewed below.

U.S. Published Patent Application No. 2005/0247383 A1 to Utsumi, et al. discloses a hot-dip galvanized dual phase steel sheet. The said steel sheet comprises, by weight %, 0.05 to 0.12% carbon, not more than 0.05% silicon, 2.7 to 3.5% manganese, 0.2 to 0.5% chromium, 0.2 to 0.5% molybdenum, not more than 0.10% aluminum, not more than 0.03% phosphorus, and not more than 0.03% sulfur. The steel sheet is obtained by a soaking process in which the temperature is set to a range from 820 to 900° C., and the time is not less than 30 seconds.

U.S. Published Patent Application Nos. 2005/0019601 A1, 2005/0016644 A1, 2004/0108024 A1 and 2004/0007297 A1, as well as U.S. Pat. Nos. 6,818,074, 6,814,819 and 6,676,774, all to Matsuoka et al., relate to a high ductility steel sheet containing appropriate amounts of carbon, silicon, manganese, phosphorus, sulfur, aluminum, nitrogen, and 0.5 to 3.0% copper. A composite structure of the said steel sheet has a ferrite phase or a ferrite phase and a tempered martensite phase as a primary phase, and a secondary phase containing retained austenite in a volume ratio of not less than 2%.

U.S. Published Patent Application No. 2004/0238082 A1 to Hasegawa, et al. discloses a high strength cold rolled dual phase steel plate. The steel consists essentially of, by weight %, 0.04 to 0.10% carbon, 0.5 to 1.5% silicon, 1.8 to 3% manganese, not more than 0.02% phosphorus, not more than 0.01% sulfur, 0.01 to 0.1% aluminum, not more than 0.005% nitrogen, and the balance being iron and inevitable impurities. The steel sheet has ductility with an elongation of 18% or more, stretch flangeability with a hole expansion ratio of 60% or more and a tensile strength of 780 MPa or more.

U.S. Published Patent Application No. 2004/0238081 A1 to Yoshinaga, et al. describes a steel sheet excellent in workability, including, by weight %, 0.08 to 0.25% carbon, 0.001 to 1.5% silicon, 0.01 to 2% manganese, 0.001 to 0.06% phosphorus, not more than 0.05% sulfur, 0.001 to 0.007% nitrogen, 0.008 to 0.2% aluminum, and at least 0.01% iron. The steel sheet has an average r-value of at least 1.2, an r-value in the rolling direction of at least 1.3, an r-value in the direction of 45 degrees to the rolling direction of at least 0.9, and an r-value in the direction of a right angle to the rolling direction of at least 1.2.

U.S. Published Patent Application No. 2004/0238080 A1 to Vandeputte, et al. relates to a cold rolled, possibly hot dip galvanized steel sheet with thickness lower than 1 mm, and tensile strength between 800 MPa and 1600 MPa, while the A80 elongation is between 5 and 17%. The composition of the steel is characterized by, in weight %, 0.10 to 0.25% carbon, 0.15 to 0.3% silicon, 1.2 to 2% manganese, 0.01 to 0.06% phosphorus, not more than 0.005% sulfur, not more than 0.01% nitrogen, not more than 0.1% aluminum, 0.001 to 0.0035% boron, not more than 0.04% Tifactor (Tifactor=Ti-3.42N+10), 0.02 to 0.08% Niobium, 0.25 to 0.75 chromium, 0.1 to 0.25 molybdenum, not more than 0.005% calcium, and the remainder being substantially iron and incidental impurities.

U.S. Published Patent Application No. 2004/0211495 A1 and U.S. Pat. No. 6,811,624, both to Hoydick, as well as U.S. Pat. No. 6,312,536 to Omiya, disclose a hot dip galvanized dual phase steel sheet. The steel has the composition of, in weight %, 0.02 to 0.20% carbon, 0.010 to 0.150% aluminum, not more than 0.01% titanium, not more than 0.5% silicon, not more than 0.06% phosphorus, not more than 0.030% sulfur, 0.8 to 2.4% manganese, 0.03 to 1.5% chromium, and 0.03 to 1.5% molybdenum.

U.S. Published Patent Application No. 2004/0047756 A1 to Rege, et al. relates to a method of producing cold rolled and annealed dual phase high strength steel sheets, including hot dip galvanized and galvannealed steel sheets having a tensile strength of at least about 750 MPa. Rege, et al. disclose that the effect on hardenability of chromium and vanadium enables production of a high strength product having a low yield ratio.

U.S. Published Patent Application No. 2004/0035500 A1 to Ikeda, et al. provides a dual phase steel sheet with good bank-hardening properties. The steel is characterized in containing, in mass %, 0.06 to 0.25% carbon, 0.5 to 3% silicon plus aluminum, 0.5 to 3% manganese, not more than 0.15% phosphorus, not more than 0.02% sulfur; and also meeting the conditions that retained austenite is at least 3%, bainite is at least 30%, and ferrite is no more than 50%.

U.S. Published Patent Application No. 2003/0221752 A1 and U.S. Pat. No. 6,709,535, both to Utsumi et al., are relevant to a dual phase steel sheet containing, by weight %, 0.08 to 0.20% carbon, not more than 0.5% silicon, not more than 3.0% manganese, not more than 0.02% phosphorus, not more than 0.02% sulfur, 0.001 to 0.15% aluminum, and further containing 0.05 to 1.5% molybdenum and 0.05 to 1.5% chromium.

U.S. Published Patent Application No. 2003/0084966 A1 to Ikeda, et al. discloses a dual phase steel sheet having low yield ratio, excellent in the balance for strength-elongation and for strength-stretch flange formability, and also excellent in bake hardening property containing, in weight %, 0.01 to 0.20% carbon, not more than 0.5% silicon, 0.5 to 3% manganese, not more than 0.06% aluminum, not more than 0.15% phosphorus, and not more than 0.02% sulfur. The matrix phase contains tempered martensite, tempered martensite and ferrite, tempered bainite, or tempered bainite and ferrite.

U.S. Pat. No. 6,869,691 to Nagataki, et al. is directed to a high strength hot dip galvanized steel sheet consisting essentially of, in weight %, 0.03 to 0.25% carbon, not more than 0.7% silicon, 1.5 to 3.5% manganese, not more than 0.05% phosphorus, not more than 0.01% sulfur, 0.05 to 1.0% chromium, 0.005 to 0.1% niobium, and the balance being iron.

U.S. Pat. No. 6,673,171 to Hlady, et al. is directed to a medium carbon steel sheet with enhanced uniform elongation for deep drawing applications. In one embodiment, a steel slab containing, in weight %, 0.30 to 0.70% carbon, 0.75 to 2.0% manganese, not more than 1.0% silicon, 0.020 to 0.10% aluminum, and the balance iron and incidental impurities is hot rolled to strip at a finishing temperature within the range of 839° C. (1542° F.) to 773° C. (1424° F.) and spheroidize annealed at a temperature below the $A_1$ temperature. In a second embodiment, a steel slab containing, in weight %, 0.40 to 0.70% carbon, 0.50 to 1.50% manganese, not more than 1.0% silicon, 0.020 to 0.10% aluminum, and the balance being iron and incidental impurities, is hot rolled, cold rolled and spheroidize annealed, with various combinations of manganese and silicon within the above ranges providing lower yield strength at levels of 60 ksi, 70 ksi, and 80 ksi with a minimum 14% uniform elongation.

U.S. Pat. No. 6,641,931 to Claessens, et al. provides a method of producing a cold rolled metal coated multi-phase steel, characterized by a tensile strength of at least 500 MPa, a yield ratio lower than 0.65 in skinned conditions, lower than 0.60 in unskinned conditions, and with good metal coating adhesion behavior. The hot metal coated steel product having a steel composition, in weight %, of not more than 1.5% manganese, 0.2 to 0.5% chromium and 0.1 to 0.25% molybdenum, undergoes a thermal treatment in the hot dip metal coating line defined by a soaking temperature between Ac1 and Ac3, a primary cooling speed higher than 25° C./s and a secondary cooling speed higher than 4° C./s.

U.S. Pat. No. 6,537,394 to Osawa, et al. is related to a method for producing hot dip galvanized steel sheet having high strength. The steel sheet contains, in weight %, 0.01 to 0.20% carbon, not more than 1.0% silicon, 1.5 to 3.0% manganese, not more than 0.10% phosphorus, not more than 0.05% sulfur, not more than 0.10% aluminum, not more than 0.010% nitrogen, 0.010 to 1.0% in total of at least one element selected from the group consisting of titanium, niobium and vanadium, and the balance being iron and incidental impurities. The steel sheet has a metal structure in which the area rate of ferrite phase is 50% or more, and the ferrite phase has an average grain diameter of 10 μm or less.

U.S. Pat. No. 6,440,584 to Nagataki, et al. is directed to a hot dip galvanized steel sheet, which contains, by weight %, 0.04 to 0.12% carbon, not more than 0.5% silicon, 1.0 to 2.0% manganese, not more than 0.05% phosphorus, not more than 0.005% sulfur, 0.05 to 1.0% chromium, 0.005 to 0.2% vanadium, not more than 0.10% aluminum, and not more than 0.010% nitrogen.

U.S. Pat. No. 6,423,426 to Kobayashi, et al. relates to a high tensile hot dip zinc coated steel plate having a composition comprising, in weight %, 0.05 to 0.20% carbon, 0.3 to 1.8% silicon, 1.0 to 3.0% manganese and iron as the balance. The steel is subjected to a primary step of primary heat treatment and subsequent rapid cooling to Ms point or lower, a secondary step of secondary heat treatment and subsequent rapid cooling, and a tertiary step of galvanizing treatment and rapid cooling, so as to obtain 20% or more by volume of tempered martensite, 2% or more by volume of retained austenite, ferrite and a low-temperature transformation phase in the steel structure.

U.S. Pat. No. 6,210,496 to Takagi, et al. discloses a high strength high workability cold rolled steel plate. The steel includes, by mass %, 0.05 to 0.40% carbon, 1.0 to 3.0% silicon, 0.6 to 3.0% manganese, 0.02 to 1.5% chromium, 0.010 to 0.20% phosphorus, and 0.01 to 0.3% aluminum, with the remainder consisting essentially of iron.

U.S. Pat. No. 5,470,403 to Yoshinaga is directed to a cold rolled steel sheet and a hot dip zinc-coated cold rolled steel sheet excellent in paint bake hardenability, non-aging properties and formability, and a process for producing the same. The steel sheet consists essentially of, in weight %, 0.0005 to 0.0070% carbon, 0.001 to 0.8% silicon, 0.3 to 4.0% manganese, 0.003 to 0.15% phosphorus, 0.0005 to 0.015% sulfur, 0.005 to 0.20% aluminum, 0.0003 to 0.0060% nitrogen, not more than 0.0030% boron, where the boron satisfies that the ratio of boron/nitrogen is not larger than 1.5, and balance iron and unavoidable impurities. The steel sheet has phases transformed at low temperature in an amount greater than 5%.

U.S. Pat. No. 5,328,528 to Chen provides a process for manufacturing cold rolled steel sheets with high strength and high ductility. The steel sheets contain, in weight %, 0.08 to 0.25% carbon, 0.03 to 2.0% silicon, 0.6 to 1.8% manganese, 0.01 to 0.10% niobium, 0.01 to 0.08% aluminum, with the rest being substantially iron and unnoticed impurities.

U.S. Pat. No. 4,770,719 to Hashiguchi, et al. provides a method of manufacturing a high strength steel sheet by annealing the steel sheet after cold rolling. The steel sheet contains, in weight %, 0.03 to 0.15% phosphorus and specified amounts of carbon, manganese and aluminum as basic components and optionally contains, as a selective component, at least one element selected from a group of silicon, chromium, molybdenum and boron, and a group of niobium, titanium and vanadium.

U.S. Pat. No. 4,708,748 to Satoh, et al. discloses a method of making cold rolled dual phase structure steel sheet, which consists of, in weight %, 0.001 to 0.008% carbon, not more than 1.0% silicon, 0.05 to 1.8% manganese, not more than 0.15% phosphorus, 0.01 to 0.10% aluminum, 0.002 to 0.050% niobium and 0.0005 to 0.0050% boron. The steel sheet is manufactured by hot and cold rolling a steel slab with the above chemical composition and continuously annealing the resulting steel sheet in such a manner that the steel sheet is heated and soaked at a temperature from $A_{c1}$ to 1000° C. and then cooled at an average rate of not less than 0.5° C./s but less than 20° C./s in a temperature range of from the soaking temperature to 750° C., and subsequently at an average cooling rate of not less than 20° C./s in a temperature rage of from 750° C. to not more than 300° C.

U.S. Pat. No. 4,609,410 to Hu relates to a high strength deep drawable dual phase steel sheet, which is produced by (i) initially annealing the sheet to achieve crystallographic textures yielding high deep drawability, (ii) heating the sheet to a temperature above A1 for a time sufficient to produce from 2 to 10% austenite, and thereafter (iii) rapidly cooling to transform at least a portion of the austenite to martensite or bainite.

U.S. Pat. No. 4,436,561 to Takahashi, et al. discloses a press-formable, high strength, dual phase structure cold rolled steel sheet. The said steel sheet is made from steel consisting of, in weight %, 0.02 to 0.20% carbon, not more than 0.1% silicon, 1.0 to 2.0% manganese, 0.005 to 0.10% acid-soluble aluminum, and 0.0003 to 0.0050% boron.

U.S. Pat. No. 4,398,970 to Marder, et al. is directed to a method to make and the resulting product of titanium and vanadium dual phase steel. The method includes the steps of (i) preparing an aluminum-killed steel consisting essentially of, in weight %, 0.05 to 0.15% carbon, not more than 2.0% manganese, not more than 1.0% silicon, 0.03 to 0.15% vanadium, and a sufficient amount of titanium, with the balance essentially being iron, where the titanium addition should be at least equal to the atomic percent of the sulfur plus nitrogen, but no more than about 1.6 times; (ii) intercritically annealing such steel within the alpha+gamma temperature range and (iii) cooling to room temperature.

U.S. Pat. No. 4,376,661 to Takechi, et al. discloses a method of producing a dual phase structure cold rolled steel sheet, which contains, in weight %, 0.01 to 0.05% carbon, not more than 0.2% silicon, 1.7 to 2.5% manganese, 0.01 to 0.10% aluminum, with the balance being iron and unavoidable impurities. The method comprises hot rolling and cold rolling by conventional process, holding the produced steel sheet for 20 seconds to 20 minutes at a temperature ranging from 720 to 850° C., and cooling the steel sheet at a cooling speed between 3° C./s and 50° C./s and also having a value (C./s) shown by following formulae:

$$12 \times [Mn(\%)]^2 - 62 \times [Mn(\%)] + 8].$$

The disclosures of all patents and published patent applications, mentioned here, are incorporated by reference.

As disclosed by many of the patents and/or published patent applications reviewed above, carbon and/or manganese are elements often added in high concentrations into steel sheets in order to obtain high hardenability and strength. However, when the concentrations of these elements are too high, the formability and weldability of manufactured steel sheets could be adversely affected.

Some of the above-noted patents and/or published patent applications describe employing a relatively high amount of copper as an alloy in the steel to achieve a desired hardenability and strength. However, this alloy is expensive, and its presence could deteriorate the surface quality and weldability of the steel sheets.

Some of the above patents and/or published patent applications describe employing phosphorus as a major strengthening element. When phosphorus is near the upper limit as described in these patents and published patent applications, the segregation of phosphorus at grain boundaries could occur, which results in brittleness of the steel sheet, and in turn impairs its formability and fatigue property. When too much phosphorus is added, the spring back angle of parts formed from the steel sheet could also be increased. In other words, the shape-fixability of the steel sheet becomes worse. Regarding the manufacturing processes, the castability and rollability of the steel sheet are also deteriorated when too much phosphorus is added. Moreover, a high phosphorus concentration in steel sheets could adversely affect coating adhesion during the hot dip coating processing.

Boron is another element described in some of the above patents and/or published patent applications as being employed for improving the hardenability and strength of the steel sheet. However, when boron is added in excess, the rollability of the steel sheet is significantly lowered. Also, the segregation of boron at grain boundaries deteriorates the formability and weldability of the steel sheet.

Vanadium, niobium and titanium are elements which are described in some of the above patents and/or published patent applications. These elements may be used alone or may be employed in combination. When concentrations of these elements are relatively high, the respective carbides, nitrides or complex precipitates are formed in the steel sheet, resulting in so-called precipitation hardening. Then, such precipitates can not only markedly reduce castability and rollability during manufacturing the steel sheet, but also can deteriorate the formability of the steel sheet when forming or press forming the produced steel sheet into the final parts.

Some of methods described in the above patents and/or published patent applications often require strict cooling rate control. The methods often involve several steps of heat treatment and rapid cooling, which are difficult to carry out during commercial production in a steel mill, and thus can restrict the commercial application of these methods. For instance, with respect to mill facility, these extra heating and cooling sections can be prohibitively expensive, and thus, often it is not feasible to add them to many steel mills or hot dip coating lines. Moreover, it is often difficult to maintain good material quality consistently during commercial production, because it is extremely difficult to control the cooling rate precisely during each cooling step when producing steel sheets with various thicknesses and/or widths, as requested by different customers.

Although the existing dual phase steels, in general, exhibit better crashworthiness than other types of high strength steels, a further improvement in impact toughness and crash performance, particularly for thin (i.e., lightweight) steel sheet, is still desired because the requirements and/or regulations for vehicle safety and fuel economy, such as automotive safety and fuel economy, are becoming higher and higher.

SUMMARY OF THE INVENTION

The present invention has thus been accomplished in view of the above-mentioned concerns and considerations, and has a principal object of developing a hot dip coated dual phase steel sheet which possesses one or more of excellent formability, excellent impact energy, or excellent weldability.

A further object of the present invention is to provide a practical manufacturing method of reliably making the dual phase steel sheet of the present invention, which method can be easily carried out by most steel manufacturers, with little or no increase in manufacturing cost.

Accordingly, the present invention provides a galvanized steel sheet comprising: a dual phase microstructure comprising a martensite phase and a ferrite phase; (b) a composition comprising: carbon in a range from about 0.01% by weight to about 0.18% by weight, manganese in a range from about 0.2% by weight to about 3% by weight, silicon≤about 1.2% by weight, aluminum in a range from about 0.01% by weight to about 0.1% by weight, chromium or nickel or a combination thereof in a range from about 0.1% by weight to about 3.5% by weight, calcium in a range from about 0.0003% by weight to about 0.01% by weight, phosphorus≤about 0.1% by weight, sulfur≤about 0.03% by weight, nitrogen≤about 0.02% by weight, molybdenum≤about 1% by weight, niobium or titanium or a combination thereof≤about 1% by weight, and boron≤about 0.006% by weight, and with no purposeful addition of copper and vanadium, with the balance of the composition comprising iron and incidental ingredients; and (c) one or more of a property chosen from (i) a weldability superior to that of known galvanized steel sheet having a dual phase microstructure of a martensite phase and a ferrite phase, (ii) an impact energy≥about 1200 g-m, measured on a V-notch Charpy specimen of about 1.5 mm thickness, or (iii) a yield strength/tensile strength ratio≤about 70%.

Moreover, the present invention provides a galvanized steel sheet comprising: (a) a dual phase microstructure comprising a martensite phase and a ferrite phase, wherein the martensite phase may comprise in one alternative from about 3% by volume to about 35% by volume of the microstructure, and may comprise in another alternative from about 11% by volume to about 35% by volume of the microstructure.

The composition may comprise carbon in a range from about 0.02% by weight to about 0.12% by weight, manganese in a range from about 0.3% by weight to about 2.8% by weight, silicon≤about 1% by weight, aluminum in a range from about 0.015% by weight to about 0.09% by weight, chromium or nickel or a combination thereof in a range from about 0.2% by weight to about 3% by weight, calcium in a range from about 0.0005% by weight to about 0.009% by weight, phosphorus≤about 0.08% by weight, sulfur≤about 0.02% by weight, nitrogen≤about 0.015% by weight, molybdenum≤about 0.8% by weight, niobium or titanium or a combination thereof≤about 0.8% by weight, and boron≤about 0.003% by weight, and with the balance of the composition comprising iron and incidental ingredients; and (c) properties of (i) a weldability superior to that of known galvanized steel sheet having a dual phase microstructure of a martensite phase and a ferrite phase, (ii) a yield strength/tensile strength ratio≤about 70%, (iii) an impact energy≥about 1200 g-m, measured on a V-notch Charpy specimen of about 1.5 mm thickness, (iv) an elongation≥about 20%, and (v) an excellent n-value.

Also, the present invention provides a galvanized steel sheet comprising: (a) a dual phase microstructure comprising a martensite phase and a ferrite phase; (b) a composition comprising: carbon in a range from about 0.01% by weight to about 0.18% by weight, manganese in a range from about 0.2% by weight to about 3% by weight, silicon≤about 1.2% by weight, aluminum in a range from about 0.01% by weight to about 0.1% by weight, chromium or nickel or a combination thereof in a range from about 0.1% by weight to about 3.5% by weight, calcium in a range from about 0.0003% by weight to about 0.01% by weight, phosphorus≤about 0.1% by weight, sulfur≤about 0.03% by weight, nitrogen≤about 0.02% by weight, molybdenum≤about 1% by weight, niobium or titanium or a combination thereof≤about 1% by weight, and boron≤about 0.006% by weight, and with no purposeful addition of copper and vanadium, with the balance of the composition comprising iron and incidental ingredients; and (c) one or more of a property chosen from (i) a weldability superior to that of known galvanized steel sheet having a dual phase microstructure of a martensite phase and a ferrite phase, (ii) an impact energy≥about 1200 g-m, measured on a V-notch Charpy specimen of about 1.5 mm thickness, or (iii) a yield strength/tensile strength ratio≤about 70%; and wherein the steel sheet is made by a method comprising: (I) at a temperature in a range between about $(A_{r3}-60)°$ C. and about 980° C. (about 1796° F.), hot rolling a steel slab having said composition into a hot band; (II) cooling the hot band at a mean rate of at least about 3° C./s (about 5.4° F./s) to a temperature not higher than about 800° C. (about 1472° F.); (III) coiling the cooled band to form a coil of the steel sheet; and (IV) galvanizing the steel sheet by heating to a temperature higher than about 600° C. (about 1112° F.), holding the temperature in a soaking zone of a galvanizing line while using a line speed faster than about 30 m/min, cooling the steel sheet to a temperature close to the temperature in the galvanizing bath in a range between about 400° C. (about 752° F.) and about 550° C. (about 1022° F.), passing the steel sheet through the galvanizing bath to coat the steel sheet with a zinc coating or a zinc alloy coating, and cooling the galvanized steel sheet.

Moreover, the present invention provides a galvanized steel sheet comprising: (a) a dual phase microstructure comprising a martensite phase and a ferrite phase, wherein the martensite phase comprises in one alternative from about 3% by volume to about 35% by volume of the microstructure, and comprises in another alternative from about 11% by volume to about 35% by volume of the microstructure; (b) a composition comprising: carbon in a range from about 0.02% by weight to about 0.12% by weight, manganese in a range from about 0.3% by weight to about 2.8% by weight, silicon≤about 1% by weight, aluminum in a range from about 0.015% by weight to about 0.09% by weight, chromium or nickel or a combination thereof in a range from about 0.2% by weight to about 3% by weight, calcium in a range from about 0.0005% by weight to about 0.009% by weight, phosphorus≤about 0.08% by weight, sulfur≤about 0.02% by weight, nitrogen≤about 0.015% by weight, molybdenum≤about 0.8% by weight, niobium or titanium or a combination thereof≤about 0.8% by weight, and boron≤about 0.003% by weight, and with no purposeful addition of copper and vanadium with the balance of the composition comprising iron and incidental ingredients; and (c) properties of (i) a weldability superior to that of known galvanized steel sheet having a dual phase microstructure of a martensite phase and a ferrite phase, (ii) a yield strength/tensile strength ratio≤about 70%, (iii) an impact energy≥about 1200 g-m, measured on a V-notch Charpy specimen of about 1.5 mm thickness, (iv) an elongation≥about 20%, and (v) an excellent n-value; and wherein the steel sheet is made by a method comprising: (I) at a temperature in a range between about $(A_{r3}-30)°$ C. and about 930° C. (about 1706° F.), hot rolling a steel slab having said composition into a hot band; (II) cooling the hot band at a mean rate of at least about 5° C./s (about 9° F./s) to a temperature not higher than about 800° C. (about 1472° F.); (III) coiling the cooled band at a temperature in a range between 400° C. (about 752° F.) and about 750° C. (about 1382° F.) to form a coil of the steel sheet; (IV) pickling the coil; (V) cold rolling the pickled coil to a desired steel sheet thickness, with a total reduction of at least about 30%; and (VI) galvanizing the steel sheet by heating to a temperature in a range between about 650° C. (1202° F.) and about 950° C. (about 1742° F.), holding the temperature in a soaking zone of a galvanizing line while using a line speed in a range from about 50 m/min to about 150 m/min, cooling the steel sheet to a temperature close to the temperature in the galvanizing bath in a range between about 425° C. (about 797° F.) and about 500° C. (about 932° F.), passing the steel sheet trough the galvanizing bath to coat the steel sheet with a zinc coating or a zinc alloy coating, and cooling the galvanized steel sheet.

Additionally, the present invention provides a method of making a galvanized steel sheet, comprising: (I) at a temperature in a range between about $(A_{r3}-60)°$ C. and about 980° C. (about 1796° F.), hot rolling a steel slab into a hot band, wherein the steel slab comprises a composition comprising: carbon in a range from about 0.01% by weight to about 0.18% by weight, manganese in a range from about 0.2% by weight to about 3% by weight, silicon≤about 1.2% by weight, aluminum in a range from about 0.01% by weight to about 0.1% by weight, chromium or nickel or a combination thereof in a range from about 0.1% by weight to about 3.5% by weight, calcium in a range from about 0.0003% by weight to about 0.01% by weight, phosphorus≤about 0.1% by weight, sulfur≤about 0.03% by weight, nitrogen≤about 0.02% by weight, molybdenum≤about 1.0% by weight, niobium or titanium or a combination thereof≤about 1% by weight, and boron≤about 0.006% by weight, and with no purposeful addition of copper and vanadium with the balance of said composition comprising iron and incidental ingredients; (II) cooling the hot band at a mean rate of at least about 3° C./s (about 5.4° F./s) to a temperature not higher than about 800° C. (about 1472° F.); (III) coiling the cooled band to form a coil; (IV) galvanizing the steel sheet by heating to a temperature higher than about 600° C. (1112° F.), holding the temperature in a soaking zone of a galvanizing line while using a line speed faster than about 30 m/min, cooling the steel sheet to a temperature close to the temperature in the galvanizing bath in a range between about 400° C. (about 752° F.) and about 550° C. (about 1022° F.), passing the steel sheet through the galvanizing bath to coat the steel sheet with a zinc coating or a zinc alloy coating, and cooling the galvanized steel sheet; and (V) obtaining a galvanized steel sheet comprising (a) a dual phase microstructure comprising a martensite phase and a ferrite phase, (b) said composition, and (c) one or more of a property chosen from (i) a weldability superior to that of known galvanized steel sheet having a dual phase microstructure of a martensite phase and a ferrite phase, (ii) an impact energy≥about 1200 g-m, measured on a V-notch Charpy specimen of about 1.5 mm thickness, or (iii) a yield strength/tensile strength ratio≤about 70%.

Moreover, the present invention provides a method of making a galvanized steel sheet, comprising: (I) at a temperature in a range between about $(A_{r3}-30)°$ C. and about 930° C. (about 1706° F.), hot rolling a steel slab having said composition into a hot band, wherein the steel slab comprises a composition comprising: carbon in a range from about 0.02% by weight to about 0.12% by weight, manganese in a range from about 0.3% by weight to about 2.8% by weight, silicon≤about 1% by weight, aluminum in a range from about 0.015% by weight to about 0.09% by weight, chromium or nickel or a combination thereof in a range from about 0.2% by weight to about 3% by weight, calcium in a range from about 0.0005% by weight to about 0.009% by weight, phosphorus≤about 0.08% by weight, sulfur≤about 0.02% by weight, nitrogen≤about 0.015% by weight, molybdenum≤about 0.8% by weight, niobium or titanium or a combination thereof≤about 0.8% by weight, and boron≤about 0.003% by weight, and with no purposeful addition of copper and vanadium with the balance of the composition comprising iron and incidental ingredients; (II) cooling the hot band at a mean rate of at least about 5° C./s (about 9° F./s) to a temperature not higher than about 800° C. (about 1472° F.); (III) coiling the cooled band at a temperature in a range between 400° C. (about 752° F.) and about 750° C. (about 1382° F.) to form a coil of the steel sheet; (IV) pickling the coil; (V) cold rolling the pickled coil to a desired steel sheet thickness, with a total reduction of at least about 30%; (VI) galvanizing the steel sheet by heating to a temperature in a range between about 650° C. (1202° F.) and about 950° C. (about 1742° F.), holding the temperature in a soaking zone of a galvanizing line while using a line speed in a range from about 50 m/min to about 150 m/min, cooling the steel sheet to a temperature close to the temperature in the galvanizing bath in a range between about 425° C. (about 797° F.) and about 500° C. (about 932° F.), passing the steel sheet through the galvanizing bath to coat the steel sheet with a zinc coating or a zinc alloy coating, and cooling the galvanized steel sheet; and (VII) obtaining a galvanized steel sheet comprising (a) a dual phase microstructure comprising a martensite phase and a ferrite phase, wherein the martensite phase comprises in one alternative from about 3% by volume to about 35% by volume of the microstructure, and comprises in another alternative from about 11% by volume to about 35% by volume of the microstructure (b) said composition, and (c) properties of (i) a weldability superior to that of known galvanized steel sheet having a dual phase microstructure of a martensite phase and a ferrite phase, (ii) a yield strength/tensile strength ratio≤about 70%, (iii) an impact energy≥about 1200 g-m, measured on a V-notch Charpy specimen of about 1.5 mm thickness, (iv) an elongation≥about 20%, and (v) an excellent n-value.

Furthermore, the present invention provides a galvanized and galvannealed steel sheet comprising: (a) a dual phase microstructure comprising a martensite phase and a ferrite phase, wherein the martensite phase comprises in one alternative from about 3% by volume to about 35% by volume of the microstructure, and comprises in another alternative from about 11% by volume to about 35% by volume of the microstructure; (b) a composition comprising: carbon in a range from about 0.01% by weight to about 0.18% by weight, manganese in a range from about 0.2% by weight to about 3% by weight, silicon≤about 1.2% by weight, aluminum in a range from about 0.01% by weight to about 0.1% by weight, chromium or nickel or a combination thereof in a range from about 0.1% by weight to about 3.5% by weight, calcium in a range from about 0.0003% by weight to about 0.01% by weight, phosphorus≤about 0.1% by weight, sulfur≤about 0.03% by weight, nitrogen≤about 0.02% by weight, molybdenum≤about 1% by weight, niobium or titanium or a combination thereof≤about 1.0% by weight, and boron≤about 0.006% by weight, and with no purposeful addition of copper and vanadium with the balance of the composition comprising iron and incidental ingredients; and (c) one or more of a property chosen from (i) a weldability superior to that of known galvanized and galvannealed steel sheet having a dual phase microstructure of a martensite phase and a ferrite phase, (ii) an impact energy≥about 1200 g-m, measured on a V-notch Charpy specimen of about 1.5 mm thickness, or (iii) a yield strength/tensile strength ratio≤about 70%.

Moreover, the present invention provides a galvanized and galvannealed steel sheet comprising: (a) a dual phase microstructure comprising a martensite phase and a ferrite phase, wherein the martensite phase comprises in one alternative from about 3% by volume to about 35% by volume of the microstructure, and comprises in another alternative from about 11% by volume to about 35% by volume of the microstructure; (b) a composition comprising: carbon in a range from about 0.02% by weight to about 0.12% by weight, manganese in a range from about 0.3% by weight to about 2.8% by weight, silicon≤about 1% by weight, aluminum in a range from about 0.015% by weight to about 0.09% by weight, chromium or nickel or a combination thereof in a range from about 0.2% by weight to about 3% by weight, calcium in a range from about 0.0005% by weight to about 0.009% by weight, phosphorus≤about 0.08% by weight, sulfur≤about 0.02% by weight, nitrogen≤about 0.015% by weight, molybdenum≤about 0.8% by weight, niobium or titanium or a combination thereof≤about 0.8% by weight, and boron≤about 0.003% by weight, and with no purposeful addition of copper and vanadium with the balance of the composition comprising iron and incidental ingredients; and (c) properties of (i) a weldability superior to that of known galvanized and galvannealed steel sheet having a dual phase microstructure of a martensite phase and a ferrite phase, (ii) a yield strength/tensile strength ratio≤about 70%, (iii) an impact energy≥about 1200 g-m, measured on a V-notch Charpy specimen of about 1.5 mm thickness, (iv) an elongation≥about 20%, and (v) an excellent n-value.

Also, the present invention provides a galvanized and galvannealed steel sheet comprising: (a) a dual phase microstructure comprising a martensite phase and a ferrite phase, wherein the martensite phase comprises in one alternative from about 3% by volume to about 35% by volume of the microstructure, and comprises in another alternative from about 11% by volume to about 35% by volume of the microstructure; (b) a composition comprising: carbon in a range from about 0.01% by weight to about 0.18% by weight, manganese in a range from about 0.2% by weight to about 3% by weight, silicon≤about 1.2% by weight, aluminum in a range from about 0.01% by weight to about 0.1% by weight, chromium or nickel or a combination thereof in a range from about 0.1% by weight to about 3.5% by weight, calcium in a range from about 0.0003% by weight to about 0.01% by weight, phosphorus≤about 0.1% by weight, sulfur≤about 0.03% by weight, nitrogen≤about 0.02% by weight, molybdenum≤about 1% by weight, niobium or titanium or a combination thereof≤about 1% by weight, and boron≤about 0.006% by weight, and with no purposeful addition of copper and vanadium with the balance of the composition comprising iron and incidental ingredients; and (c) one or more of a property chosen from (i) a weldability superior to that of known galvanized and galvannealed steel sheet having a dual phase microstructure of a martensite phase and a ferrite phase, (ii) an impact energy≥about 1200 g-m, measured on a V-notch Charpy specimen of about 1.5 mm thickness, or (iii) a yield strength/tensile strength ratio≤about 70%; and wherein the galvanized and galvannealed steel sheet is made by a method comprising: (I) at a temperature in a range between about $(A_{r3}-60)°$ C. and about 980° C. (about 1796° F.), hot rolling a steel slab having said composition into a hot band; (II) cooling the hot band at a mean rate of at least about 3° C./s (about 5.4° F./s) to a temperature not higher than about 800° C. (about 1472° F.); (III) coiling the cooled band to form a coil; (IV) galvanizing the steel sheet by heating to a temperature higher than about 600° C. (1112° F.), holding the temperature in a soaking zone of a galvanizing line while using a line speed faster than about 30 m/min, cooling the steel sheet to a temperature close to the temperature in the galvanizing line in a range between about 400° C. (about 752° F.) and about 550° C. (about 1022° F.), passing the steel sheet through the galvanizing bath to coat the steel sheet with a zinc coating or a zinc alloy coating, and cooling the galvanized steel sheet; and (V) galvannealing the steel sheet by reheating to a temperature in a range from about 450° C. (about 842° F.) to about 650° C. (about 1202° F.) and cooling the steel sheet.

Moreover, the present invention provides a galvanized and galvannealed steel sheet comprising: (a) a dual phase microstructure comprising a martensite phase and a ferrite phase, wherein the martensite phase comprises in one alternative from about 3% by volume to about 35% by volume of the microstructure, and comprises in another alternative from about 11% by volume to about 35% by volume of the microstructure; (b) a composition comprising: carbon in a range from about 0.02% by weight to about 0.12% by weight, manganese in a range from about 0.3% by weight to about 2.8% by weight, silicon≤about 1% by weight, aluminum in a range from about 0.015% by weight to about 0.09% by weight, chromium or nickel or a combination thereof in a range from about 0.2% by weight to about 3% by weight, calcium in a range from about 0.0005% by weight to about 0.009% by weight, phosphorus≤about 0.08% by weight, sulfur≤about 0.02% by weight, nitrogen≤about 0.015% by weight, molybdenum≤about 0.8% by weight, niobium or titanium or a combination thereof≤about 0.8% by weight, and boron≤about 0.003% by weight, and with no purposeful addition of copper and vanadium with the balance of the composition comprising iron and incidental ingredients; and (c) properties of (i) a weldability superior to that of known galvanized and galvannealed steel sheet having a dual phase microstructure of a martensite phase and a ferrite phase, (ii) a yield strength/tensile strength ratio≤about 70%, (iii) an impact energy≥about 1200 g-m, measured on a V-notch Charpy specimen of about 1.5 mm thickness, (iv) an elongation≥about 20%, and (vii) an excellent n-value; and wherein the steel sheet is made by a method comprising: (I) at a temperature in a range between about $(A_{r3}-30)°$ C. and about 930° C. (about 1706° F.), hot rolling a steel slab having said composition into a hot band; (II) cooling the hot band at a mean rate of at least about 5° C./s (about 9° F./s) to a temperature not higher than about 800° C. (about 1472° F.); (III) coiling the cooled band at a temperature in a range between 400° C. (about 752° F.) and about 750° C. (about 1382° F.) to form a coil of the steel sheet; (IV) pickling the coil; (V) cold rolling the pickled coil to a desired steel sheet thickness, with a total reduction of at least about 30%; (VI) galvanizing the steel sheet by heating to a temperature in a range between about 650° C. (1202° F.) and about 950° C. (about 1742° F.), holding the temperature in a soaking zone of a galvanizing line while using a line speed in a range from about 50 m/min to about 150 m/min, cooling the steel sheet to a temperature close to the temperature in the galvanizing bath in a range between about 425° C. (about 797° F.) and about 500° C. (about 932° F.), passing the steel sheet through the galvanizing bath to coat the steel sheet with a zinc coating or a zinc alloy coating, and cooling the galvanized steel sheet; and (VII) galvannealing the steel sheet by reheating to a temperature in a range from about 500° C. (about 932° F.) to about 600° C. (about 1112° F.) and cooling the steel sheet.

Additionally, the present invention provides a method of making a galvanized and galvannealed steel sheet, comprising: (I) at a temperature in a range between about $(A_{r3}-60)°$ C. and about 980° C. (about 1796° F.), hot rolling a steel slab into a hot band, wherein the steel slab comprises a composition comprising: carbon in a range from about 0.01% by weight to about 0.18% by weight, manganese in a range from about 0.2% by weight to about 3% by weight, silicon≤about 1.2% by weight, aluminum in a range from about 0.01% by weight to about 0.1% by weight, chromium or nickel or a combination thereof in a range from about 0.1% by weight to about 3.5% by weight, calcium in a range from about 0.0003% by weight to about 0.01% by weight, phosphorus≤about 0.1% by weight, sulfur≤about 0.03% by weight, nitrogen≤about 0.02% by weight, molybdenum≤about 1% by weight, niobium or titanium or a combination thereof≤about 1% by weight, and boron≤about 0.006% by weight, and with no purposeful addition of copper and vanadium with the balance of said composition comprising iron and incidental ingredients; (II) cooling the hot band at a mean rate of at least about 3° C./s (about 5.4° F./s) to a temperature not higher than about 800° C. (about 1472° F.); (III) coiling the cooled band to form a coil; (IV) galvanizing the steel sheet by heating to a temperature higher than about 600° C. (about 1112° F.), holding the temperature in a soaking zone of a galvanizing line while using a line speed faster than about 30 m/min, cooling the steel sheet to a temperature close to the temperature in the galvanizing bath in a range between about 400° C. (about 752° F.) and about 550° C. (about 1022° F.), passing the steel sheet through the galvanizing bath to coat the steel sheet with a zinc coating or a zinc alloy coating, and cooling the galvanized steel sheet; (V) galvannealing the steel sheet by reheating to a temperature in a range from about 450° C. (about 842° F.) to about 650° C. (about 1202° F.) and cooling the steel sheet; and (VI) obtaining a galvanized and galvannealed steel sheet comprising (a) a dual phase microstructure comprising a martensite phase and a ferrite phase, wherein the martensite phase comprises in one alternative from about 3% by volume to about 35% by volume of the microstructure, and comprises in another alternative from about 11% by volume to about 35% by volume of the microstructure, (b) said composition, and (c) one or more of a property chosen from (i) a weldability superior to that of known galvanized and galvannealed steel sheet having a dual phase microstructure of a martensite phase and a ferrite phase, (ii) an impact energy≥about 1200 g-m, measured on a V-notch Charpy specimen of about 1.5 mm thickness, or (iii) a yield strength/tensile strength ratio≤about 70%.

Moreover, the present invention provides a method of making a galvanized and galvannealed steel sheet, comprising: (I) at a temperature in a range between about $(A_{r3}-30)°$ C. and about 930° C. (about 1706° F.), hot rolling a steel slab having said composition into a hot band, wherein the steel slab comprises a composition comprising: carbon in a range from about 0.02% by weight to about 0.12% by weight, manganese in a range from about 0.3% by weight to about 2.8% by weight, silicon≤about 1% by weight, aluminum in a range from about 0.015% by weight to about 0.09% by weight, chromium or nickel or a combination thereof in a range from about 0.2% by weight to about 3% by weight, calcium in a range from about 0.0005% by weight to about 0.009% by weight, phosphorus≤about 0.08% by weight, sulfur≤about 0.02% by weight, nitrogen≤about 0.015% by weight, molybdenum≤about 0.8% by weight, niobium or titanium or a combination thereof≤about 0.8% by weight, and boron≤about 0.003% by weight, and with no purposeful addition of copper and vanadium with the balance of the composition comprising iron and incidental ingredients; (II) cooling the hot band at a mean rate of at least about 5° C./s (about 9° F./s) to a temperature not higher than about 800° C. (about 1472° F.); (III) coiling the cooled band at a temperature in a range between about 400° C. (about 752° F.) and about 750° C. (about 1382° F.) to form a coil of the steel sheet; (IV) pickling the coil; (V) cold rolling the pickled coil to a desired steel sheet thickness, with a total reduction of at least about 30%; (VI) galvanizing the steel sheet by heating to a temperature in a range between about 650° C. (1202° F.) and about 950° C. (about 1742° F.), holding the temperature in a soaking zone of a galvanizing line while using a line speed in a range from about 50 m/min to about 150 m/min, cooling the steel sheet to a temperature close to the temperature in the galvanizing bath is performed in a range between about 425° C. (about 797° F.) and about 500° C. (about 932° F.), passing the steel sheet through the galvanizing bath to coat the steel sheet with a zinc coating or a zinc alloy coating, and cooling the galvanized steel sheet; (VII) galvannealing the steel sheet by reheating to a temperature in a range from about 500° C. (about 932° F.) to about 600° C. (about 1112° F.) and cooling the steel sheet; and (VIII) obtaining a galvanized and galvannealed steel sheet comprising (a) a dual phase microstructure comprising a martensite phase and a ferrite phase, wherein the martensite phase comprises in one alternative from about 3% by volume to about 35% by volume of the microstructure, and comprises in another alternative from about 11% by volume to about 35% by volume of the microstructure (b) said composition, and (c) properties of (i) a weldability superior to that of known galvanized steel sheet having a dual phase microstructure of a martensite phase and a ferrite phase, (ii) a yield strength/tensile strength ratio≤about 70%, (iii) an impact energy≥about 1200 g-m, measured on a V-notch Charpy specimen of about 1.5 mm thickness, (iv) an elongation≥about 20%, and (v) an excellent n-value.

The invention is now discussed in connection with the accompanying Figures and the mill production Examples as best described below.

DESCRIPTION OF INVENTION

Figure 1:
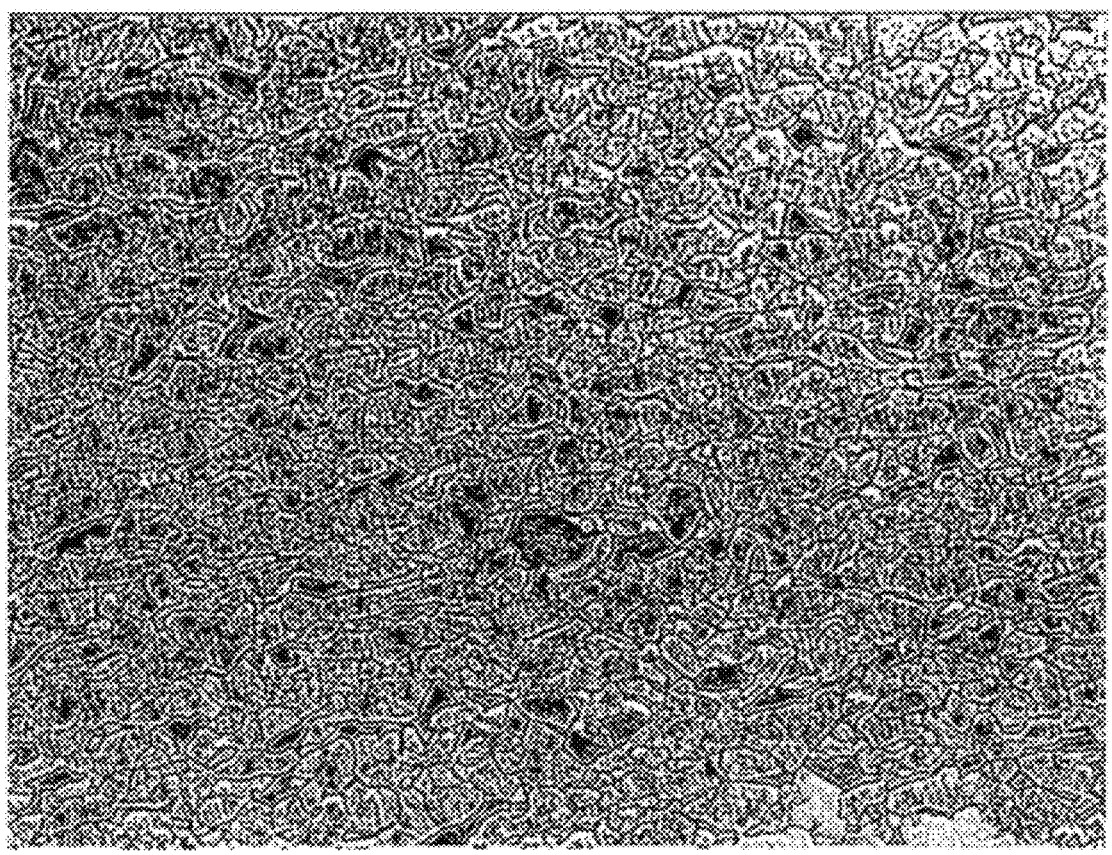
FIG. 1 is a photograph taken using a microscope and showing the dual phase structure of an embodiment the presently invented hot dip coated steel sheets, with hard martensite islands uniformly distributed in the soft ferrite matrix.

The present invention is directed to high strength dual phase-structured (ferrite+martensite) steel sheet product and a method of manufacturing such a steel sheet. The steel sheet is hot dip coated (galvanized, usually with zinc or zinc alloy, and optionally galvannealed). With respect to preferred applications, the inventive steel sheet can be used, after being formed, for applications including, but not limited to, automobiles, ships, airplanes, trains, electrical appliances, building components and machineries.

The inventive hot dip coated high strength dual phase-structured (ferrite+martensite) steel sheet has one or more of a property chosen from excellent formability, excellent impact toughness, excellent crash resistance, excellent weldability, and in a preferred embodiment, has one or more of excellent surface quality or being robust under various manufacturing or processing conditions.

By excellent formability is meant a low yield strength/tensile strength ratio≤about 70%, more particularly≤about 65%, and/or a total elongation≥about 20%, more particularly≥about 23%, and even more particularly≥about 25%.

By excellent impact toughness and/or excellent crash resistance is meant an impact energy≥about 1200 g-m, more particularly≥about 1300 g-m, and even more particularly≥about 1400 g-m, the impact energy being measured on a V-notch Charpy specimen of about 1.5 mm thickness.

By excellent surface quality is meant that for the preferred embodiment where the sheet is pickled, and then galvanized or then galvanized and also optionally galvannealed, then when the sheet is tension leveled and skin passed using a total elongation or extension of not more than 1.0%, a very good surface appearance is qualitatively observed.

By excellent weldability is meant excellent self weldabilty and/or excellent weldability to different types of steel sheet, one or both weldabilities being superior to the respective weldability of known hot dip coated dual phase steel sheet. Specifically with respect to excellent self weldability is meant that when peel tests are performed on weld nuggets of like pieces of steel sheet that are resistance spot welded together, the nuggets are observed to have de minimus and/or no shrinkage voids and micro cracks, using a wide range of industrial welding conditions. Specifically with respect to excellent weldability to different types of steel sheet is intended a mean bulk electrical resistivity that is lower for the inventive hot dip coated dual phase steel sheets than the mean bulk electrical resistivity of hot dip coated dual phase steel sheets according to the prior art, and thus the inventive hot dip coated dual phase steel sheets are more resistance spot weldable to other types of commercial hot dip coated steel sheets, such as hot dip coated carbon and high strength low alloy steel sheets, than are the prior art hot dip coated dual phase steel sheets.

By robust under various manufacturing or processing conditions is meant that steel sheets manufactured in accordance with the method of the present invention, using various hot dip coating processing conditions, namely different annealing temperatures (the temperature in the soaking zone of the galvanizing line) higher than about 600° C. (about 1112° F.) and different line speeds faster than about 30 m/min, consistently have, in a preferred embodiment, an excellent total elongation≥about 20%, more particularly≥about 23%, and even more particularly≥about 25%, and/or an excellent yield strength/tensile strength ratio≤about 70%, more particularly≤about 65%.

In general, the present invention is carried out by a method as follows for producing hot dip coated high strength dual phase-structured (ferrite+martensite) steel sheet.

(1) Employing a steel production plant, such as a compact strip production (CSP) facility, use a continuous slab caster or an ingot caster to produce or to obtain as a starting material a steel slab, typically with thickness ranging from about 25 to about 100 mm, and with a composition including (in weight percentages) about 0.01-about 0.18% carbon (C), about 0.2-about 3.0% manganese (Mn), not more than about 1.2% silicon (Si), about 0.01-about 0.10% aluminum (Al), about 0.0003-about 0.0100% calcium (Ca), the sum of chromium (Cr) and Nickel (Ni) satisfying the relationship: about 0.1%≤(Cr+Ni)≤about 3.5%, not more than about 0.10% phosphorous (P), not more than about 0.03% sulfur (S), not more than about 0.02% nitrogen (N), not more than about 1.0% molybdenum (Mo), not more than about 0.80% copper (Cu), not more than about 1.0% of the total amount of titanium (Ti) and vanadium (V) and niobium (Nb), and not more than about 0.0060% boron (B), the remainder essentially being iron (Fe) and incidental ingredients, such as incidental impurities.

(2) Hot roll the steel slab to form a hot rolled band (alternatively known as a hot rolled sheet) and complete the hot rolling process at a temperature in the range between about $(A_{r3}-60)°$ C. and about 980° C. (about 1796° F.).

(3) Immediately after completing hot rolling, cool the hot rolled steel sheet, at a mean rate not slower than about 3° C./s (about 5.4° F./s).

(4) Coil the cooled steel sheet at a temperature lower than about 800° C. (about 1472° F.).

(5) As an optional step, pickle the coil to improve the surface quality.

(6) Typically, cold roll the coil to a desired steel sheet thickness, with the total draft (also known as reduction) being not less than about 30%.

(7) Perform hot dip plating (also known as the galvanizing process) in order to apply a zinc coating and/or a zinc alloy coating onto the surface of the sheet to improve the corrosion resistance, by heating or pre-heating the steel sheet to a temperature higher than about 600° C. (about 1112° F.), holding that temperature in the soaking zone of the galvanizing line while using a line speed (also known as the process speed) faster than about 30 m/min, cooling the steel sheet to a temperature close to the temperature in the galvanizing bath, usually in a range between about 400° C. (about 752° F.) and about 550° C. (about 1022° F.), and subsequently passing the steel sheet through the galvanizing bath (also known as a pot) to coat the steel sheet with a zinc coating and/or a zinc alloy coating. The sheet may then be cooled; no particular cooling rate is required.

(8) Sometimes after the steel sheet is dipped into and removed from the galvanizing bath, an alloying treatment (also known as a galvannealing treatment) may be applied to manufacture hot dip galvannealed high strength dual phase steel sheet. This galvannealing treatment can be conducted by reheating the steel sheet to a temperature in the range from about 450° C. (about 842° F.) to about 650° C. (about 1202° F.), more particularly from about 500° C. (about 932° F.) to about 600° C. (about 1112° F.). The sheet may then be cooled; no particular cooling rate is required.

(9) After either hot dip galvanizing or both galvanizing and galvannealing, then tension leveling and/or skin passing and/or temper rolling can occasionally be employed to improve the surface shape of the coated steel sheet.

(10) Either the "as-cold-rolled" steel sheet or hot dip coated steel sheet may be formed or press formed into the desired end shapes for any final applications.

In the foregoing process, the hot-rolled steel sheet may be directly subjected to hot dip coating (also known as galvanizing) under similar conditions as above in a continuous hot dip galvanizing line. In this case, the above step (6) cold rolling could be eliminated.

Alternatively, a steel slab thicker than 100 mm with the above chemical composition can be produced in an integrated hot mill by continuous casting or by ingot casting, which thicker steel slab can also be employed as a starting material. For such a thicker slab produced in an integrated mill, a reheating process may be desired before conducting the above-mentioned hot rolling operation. Typically, the steel slab is reheated to a temperature in the range between about 1000° C. (1832° F.) and about 1350° C. (2462° F.), followed by holding at this temperature for a time period of not less than about 10 minutes.

In a preferred embodiment, the dual phase hot dip coated steel sheet manufactured according to the present invention possesses a microstructure having about 3% to about 45% (in volume percentages) martensite as a hard second phase embedded in the ferrite matrix. Alternatively, the present steel may have between about 3% and 35% by volume martensite. In yet another alternative, the present steel may have between about 11% and 35% by volume martensite.

FIG. 1 depicts a typical micrograph of a steel sheet in accordance with the present invention. The micrograph was obtained using a Nikon Epiphot 200 Microscope, at 500× magnification. As illustrated by this micrograph, hard martensite islands are uniformly distributed in the soft ferrite matrix. It is such a dual phase structure that provides the excellent combination of high strength, excellent formability, superior impact toughness and crash performance, and/or outstanding weldability for the steel sheet of the present invention.

As demonstrated in more detail below, the preferred ranges of the chemical elements desirably contained in the dual phase, hot dip coated steel sheets produced according to the present invention typically can be readily obtained using most already existing, commercial manufacturing facilities.

The preferred ranges for the inventive composition and the reasons for these desired limitations are described in more detail below.

Carbon:

Carbon is an element essential to the hardenability and strength of the steel sheet. Carbon should be present in an amount of at least about 0.01% in order to provide necessary strength for the steel sheet. Thus, the lower limit of carbon content is about 0.01% by weight in the preferred embodiment of the present invention. In order to secure the formation of martensite contributing to the desired high strength, however, a more preferable lower limit of carbon is about 0.02% by weight in the present invention. Since a large amount of carbon present in the steel sheet leads to degradation in the formability and weldability, the upper limit of carbon in the present invention should be about 0.18% for an integrated mill, and more particularly, about 0.12% for mills at CSP plants further to assure excellent castability of the steel sheet.

Manganese:

Manganese acts as another effective alloying element enhancing the strength of steel sheets. An amount of at least about 0.2% by weight of manganese should be present in order to ensure the strength and hardenability of the inventive steel sheet. The lower limit of manganese content is thus about 0.2% by weight in the preferred embodiment of the present invention. More particularly, in order to enhance the stability of austenite and to form at least about 3% by volume of a desired martensite phase in the final steel sheet, the amount of manganese should be more than about 0.3% by weight. Therefore, it is more preferable for the steel sheet of the present invention to contain at least about 0.3% by weight of manganese. However, when the amount exceeds about 3% by weight, the weldability of the steel sheet can be adversely affected. From the viewpoint of weldability, therefore, the Mn content is preferably about 3% by weight or less, more preferably about 2.8% by weight or less.

Silicon:

Typically, the addition of a small amount of silicon is useful as a strengthening element, and improves the strength of steel sheets without a significant decrease in the ductility or formability of the steel sheets. In addition, silicon promotes the ferrite transformation and delays the pearlite transformation, which is important for stably attaining a dual phase (ferrite+martensite) structure in the final steel sheet. However, when the content of silicon exceeds about 1.2%, the beneficial effect of silicon typically is maximized (i.e., a saturated effect is achieved) and thus an economical disadvantage occurs. Accordingly, the upper limit of the silicon content should be about 1.2% by weight. More importantly, the excessive addition of silicon can degrade the adhesiveness of a zinc coating and/or zinc alloy coating, which could lead to failure in the appropriate formation of a hot dip coated/plated layer. Accordingly, the Si content more preferably is about 1% by weight or less in order to obtain a good surface property for the hot dip coated steel sheet.

Aluminum:

Aluminum is employed for deoxidization of the steel and is effective in fixing nitrogen to form aluminum nitrides. Theoretically, the acid-soluble amount of (27/14) N, i.e., 1.9 times the amount of nitrogen, is required to fix nitrogen as aluminum nitrides. Practically, however, the use of at least about 0.01% of aluminum by weight typically is effective as a deoxidization element. Therefore, the lower limit of aluminum content is preferably about 0.01% by weight, more preferably about 0.015% by weight. When the content of aluminum exceeds about 0.1%, on the other hand, the ductility and formability of the steel sheet can be significantly degraded. The preferred amount of aluminum is thus at most about 0.1% by weight, more preferably about 0.09% by weight.

Chromium and Nickel:

Chromium and Nickel are important elements in the present invention because both of these elements are effective for increasing the hardenability and strength of the steel sheet. These elements are also useful for stabilizing the remaining austenite and promoting the formation of martensite while having minimal or no adverse effects on austenite to ferrite transformation. These elements can also improve the impact toughness of steel sheet because these elements contribute to the suppression of formation of micro-cracks and voids. Furthermore, these elements are effective for preventing softening at HAZ (heat affected zone) during welding, and thus help to improve the weldability of the steel sheet. In order to attain these beneficial effects, the sum of these two elements, Cr+Ni, should be at least about 0.1%. For more adequately developing such beneficial effects, the sum of Cr+Ni is preferably about 0.2% or more. In order to maintain a reasonable manufacturing cost, on the other hand, the sum of Cr+Ni should be limited to a maximum of about 3.5% by weight. Since the phosphatability and thus the surface quality of hot dip galvanized steel sheet could be deteriorated when Cr+Ni are added in excess, the upper limit of the sum of Cr+Ni, is preferably about 3%. Therefore, the total amount of Cr+Ni should be in a range of from about 0.1% to about 3.5%, and more preferably from about 0.2% to about 3% by weight in the steel sheet of the present invention.

Calcium:

Calcium is another important element in the steel sheet of the present invention. Calcium helps to modify the shape of sulfides. As a result, calcium reduces the harmful effect due to the presence of sulfur and eventually improves the toughness and fatigue properties of the steel sheet. Since an amount of at least about 0.0003% by weight of calcium should be present to secure this beneficial effect, the lower limit of calcium content should be about 0.0003% by weight in the preferred embodiment of the present invention. It is also of note that this beneficial effect typically is maximized (i.e., a saturated effect is achieved) when the amount of calcium exceeds about 0.01% by weight, so that the preferred upper limit of calcium is about 0.01% by weight. More particularly, the calcium ranges from about 0.0005% by weight to about 0.009% by weight.

Phosphorus:

Although no phosphorus may be present, the addition of a small amount of phosphorus is useful since in principle, phosphorus exerts a similar effect to manganese and silicon in view of solid solution hardening. However, when a large amount of phosphorus is added to the steel, the castability and rollability of the steel sheet are deteriorated. The segregation of excess phosphorus at grain boundaries results in brittleness of the steel sheet, which in turn lowers its formability and weldability. Moreover, the excessive addition of phosphorus degrades the surface quality of the hot dip coated steel sheet. For these reasons, it is of importance that the amount of phosphorus should be less than about 0.1% by weight, more preferably not more than about 0.08% by weight.

Sulfur:

Sulfur is not usually added to the steel because sulfur causes deterioration of ductility, formability and toughness. Thus, very low sulfur content is always preferable, and no sulfur is even more preferable. However, sulfur is typically present as a residual element, the amount of which depends on the employed steel making techniques. Since the steel of the present invention contains manganese, sulfur is generally precipitated in the form of manganese sulfides. A large amount of manganese sulfide precipitates deteriorates the formability and fatigue properties of the steel sheet. Accordingly, the upper limit of sulfur content should be about 0.03%, more preferably about 0.02% by weight.

Nitrogen:

Typically, the addition of a small amount of nitrogen may be beneficial. However, when nitrogen exceeds about 0.02%, the ductility and formability of steel sheet typically are significantly reduced. The upper limit of the nitrogen content accordingly should be about 0.02%, more preferably about 0.015% by weight.

Molybdenum:

Molybdenum is another element useful for improving the hardenability, strength and toughness of the steel sheet. Molybdenum is also useful for preventing softening at HAZ (heat affected zone) during welding to improve the weldability of the steel sheet. Molybdenum can thus be generally employed to replace some of Cr and/or Ni. However, excess addition of molybdenum could result in maximizing of the beneficial effect (i.e., a saturated effect is achieved) and hence could deteriorate the weldability of the steel sheet. Thus, the upper limit for molybdenum should be about 1% by weight, more preferably about 0.8% by weight.

Copper:

Although no copper may be present, the addition of a small amount of copper as an alloying element is effective for improving the hardenability and strength of the steel sheet. However, excess addition of this element could significantly lower the surface quality and weldability of the steel sheet. In addition, this element is expensive. Accordingly, the upper limit for this element should be about 0.8%, more preferably, about 0.6%, and even more preferably about 0.5% by weight. In one application, the composition includes no purposeful addition of copper. Alternatively, the composition may include no purposeful addition of copper. In this alternative, however, incidental amounts of copper not intended may be present as an impurity arising from use of scrap metals and other additions in steelmaking Niobium, Titanium and/or Vanadium:

Although no niobium, titanium or vanadium may be present, the addition of a small amount of niobium, titanium, and/or vanadium can be beneficial as these alloying elements have a strong effect for retarding austenite recrystallization and refining ferrite grains. One of these elements may be used alone or they may be employed in any combination. When a moderate amount of one or more of these elements is added, the strength of the final steel sheet is properly increased. These elements are also useful to accelerate the transformation of austenite to ferrite. However, when the total content of these elements exceeds about 1% by weight, large amounts of the respective precipitates are typically formed in the steel sheet. The hardening that corresponds to the precipitation becomes very high, which could reduce castability and rollability during manufacturing the steel sheet, and also deteriorate the formability of the steel sheet when forming or press forming the produced steel sheet into the final parts. It is therefore preferred that the total content of Nb, Ti, and/or V is limited to not more than about 1%, and more preferably limited to not more than about 0.8% by weight. Alternatively, the composition may include no purposeful addition of vanadium. In this alternative, however, incidental amounts of vanadium not intended may be present as an impurity arising from use of scrap metals and other additions in steelmaking Boron:

Although no boron may be present, the addition of a small amount of boron as an alloying element is a very effective element for improving the hardenability and strength of the steel sheet. However, when boron is added in excess, the rollability of the steel sheet typically is significantly lowered. Besides, the segregation of boron at grain boundaries deteriorates the formability. For these reasons, the upper limit of the boron content should be about 0.006%, more preferably about 0.003% by weight.

Incidental Ingredients:

Incidental ingredients, such as other impurities, should be kept to as small a concentration as is practicable. Incidental ingredients are typically the impurities not intended arising from use of scrap metals and other additions in steelmaking, as occurs in preparation of molten composition in a steel-making furnace such as an electric arc furnace (EAF).

By employing a steel starting material falling within the above compositional or chemistry constraints, the manufacturing process to make steel should have less demanding facility requirements and less restrictive processing controls. More particularly, the process typically can be carried out at most existing CSP or integrated mills without any additional equipment or added capital cost.

A more specific recitation of a preferred process in accordance with the present invention includes the following steps.

(a) Prepare a starting material melting steel having a composition falling within the ranges discussed above.

(b) Use a continuous slab caster or an ingot caster to produce a slab having a thickness suitable for hot rolling into a hot rolled band, alternatively referred to as a hot rolled steel sheet.

(c) For a thick slab (typical thickness greater than about 100 mm) produced in an integrated mill, the thick slab usually has to be re-heated in a reheating furnace to a temperature in the range between about 1050° C. (about 1922° F.) and about 1350° C. (about 2462° F.). Hold the thick steel slab in the specified temperature range for a time period of not less than about 10 minutes, and preferably not less than about 30 minutes, in order to assure the uniformity of the initial microstructure of the thick slab before conducting the hot rolling process. As noted above, for a thin slab (typical thickness from about 25 mm to about 100 cm) cast in a compact strip production (CSP) plant, the reheating process is usually eliminated.

(d) Hot roll the steel slab into a hot band (also called a hot rolled sheet) and complete the hot rolling process at a temperature in a range between about $(A_{r3}-60)°$ C. and about 980° C. (about 1796° F.), and preferably in a range between about $(A_{r3}-30)°$ C. and about 930° C. (about 1706° F.) in order to obtain a fine-grained ferrite matrix.

(e) Cool the hot rolled steel, immediately after completing hot rolling, at a mean cooling rate not slower than about 3° C./s (about 5.4° F./s), preferably not slower than about 5° C./s (about 9° F./s).

(f) Coil the hot rolled steel by a conventional coiler when the hot band has cooled to a temperature not higher than about 800° C. (about 1472° F.). Coiling may be effected at essentially any temperature below about 800° C. (about 1472° F.) down to the ambient temperature. It is preferred, in order to obtain better formability and drawability properties, to start the coiling process at a temperature between about 400 C. (about 752° F.) and about 750° C. (about 1382° F.).

(g) As an optional step, pickle the hot rolled coil, to improve the surface quality.

(h) Typically, cold roll the hot rolled and optionally pickled coil to a desired steel sheet thickness at a desired time. A conventional cold rolling stand can be used, with the total draft or reduction being not less than about 30%, preferably not less than about 45%.

(i) Transfer the cold rolled steel sheet to a conventional hot dip coating line (also known as a continuous steel sheet galvanizing line), which line typically has a sheet feeding facility, a heating or pre-heating zone, a soaking zone (also known as an annealing zone), a cooling zone and a galvanizing bath (also known as a zinc pot or a zinc alloy pot). More particularly, the cold rolled steel sheet is fed to the heating zone for continuous heating of the steel sheet to a temperature higher than about 600° C. (about 1112° F.), preferably in the range between about 650° C. (about 1202° F.) and about 950° C. (about 1742° F.), more preferably about 700° C. (about 1292° F.) to about 925° C. (about 1697° F.), and then the sheet is passed through the soaking zone to maintain that temperature, while using a line speed (also known as process speed) higher than about 30 m/min., preferably in a range between about 50 m/min. and about 150 m/min.

(j) Subsequently, move the steel sheet through the cooling zone in the galvanizing line. For the purpose of generating ferrite and martensite structure and avoiding the formation of pearlite, the hot dip coated dual phase steel sheets produced by means of prior art processes generally require a specific rapid cooling rate after soaking or annealing. On the other hand, the compositions of the steel sheet employed in the present invention are set to ensure excellent and stabilized material properties regardless of variations in cooling pattern and/or rate, and therefore, a particular range for the cooling rate in this step of the present invention is not required.

(k) Discontinue cooling the steel sheet when the temperature of the sheet is reduced to a temperature close to the temperature in the galvanizing bath, the latter of which is usually set up in a range between about 400° C. (about 752° F.) and about 550° C. (about 1022° F.), preferably in a range between about 425° C. (about 797° F.) and about 500° C. (about 932° F.).

(l) Pass the steel sheet through the galvanizing bath to coat the steel sheet with a coating, usually a zinc coating or a zinc alloy coating, to improve the corrosion resistance of the steel sheet. The residence time in the galvanizing bath is typically in the range of about 1 s to about 10 s, but may vary somewhat depending on the facility and the coating weight specified by the customer. The sheet may then be cooled; no particular cooling rate is required.

(m) Although the hot dip galvanized high strength dual phase-structured steel sheet can be manufactured as described above, the hot dip galvanized steel sheet, depending on the requirements requested by the customer, may be subjected to another alloying process to produce a hot dip galvannealed steel sheet. This type of hot dip galvanized and also galvannealed steel sheet is included within the scope of the present invention. To manufacture this type of steel, a subsequent alloying treatment may be performed after the steel sheet is dipped into and removed out from the galvanizing bath. This subsequent alloying process may be carried out in a conventional way, such as by reheating the steel sheet to a temperature in a range from 450° C. (842° F.) to 650° C. (1202° F.), more particularly from about 500° C. (about 932° F.) to about 600° C. (about 1112° F.).

(n) After the alloying process of galvannealing as mentioned above in (m), another cooling process may also be conducted. A particular cooling rate during this process is not required, and may be, for instance, 5° C./s or more.

(o) Once completing hot dip coating galvanizing or both hot dip galvanizing and galvannealing, then one or more of the following processes:
(I) tension leveling,
(II) skin passing, or
(III) temper rolling can occasionally be employed to improve the surface shape and/or to impart the desired surface texture of the coated steel sheets. The amount of extension or elongation used during processes (I), (II), or (III) may be selected in a wide range, for instance, from about 0% to about 3%, according to the thickness, width and shape of the coated steel sheets, as well as the capability of the relevant facility.

(p) If desired, the "as-cold-rolled" steel sheet or hot dip coated steel sheet, either hot dip galvanized or both hot dip galvanized and galvannealed, manufactured according to the present invention as described above, may be formed or press formed into a desired end shape for a final application.

In the foregoing process, the hot-rolled steel sheet may be directly subjected to hot dip coating (either hot dip galvanizing or both hot dip galvanizing and galvannealing) under similar conditions in a continuous hot dip galvanizing line as described above in steps (l) through (m). In this case, the above described step (h) cold rolling could be eliminated.

Figure 2:
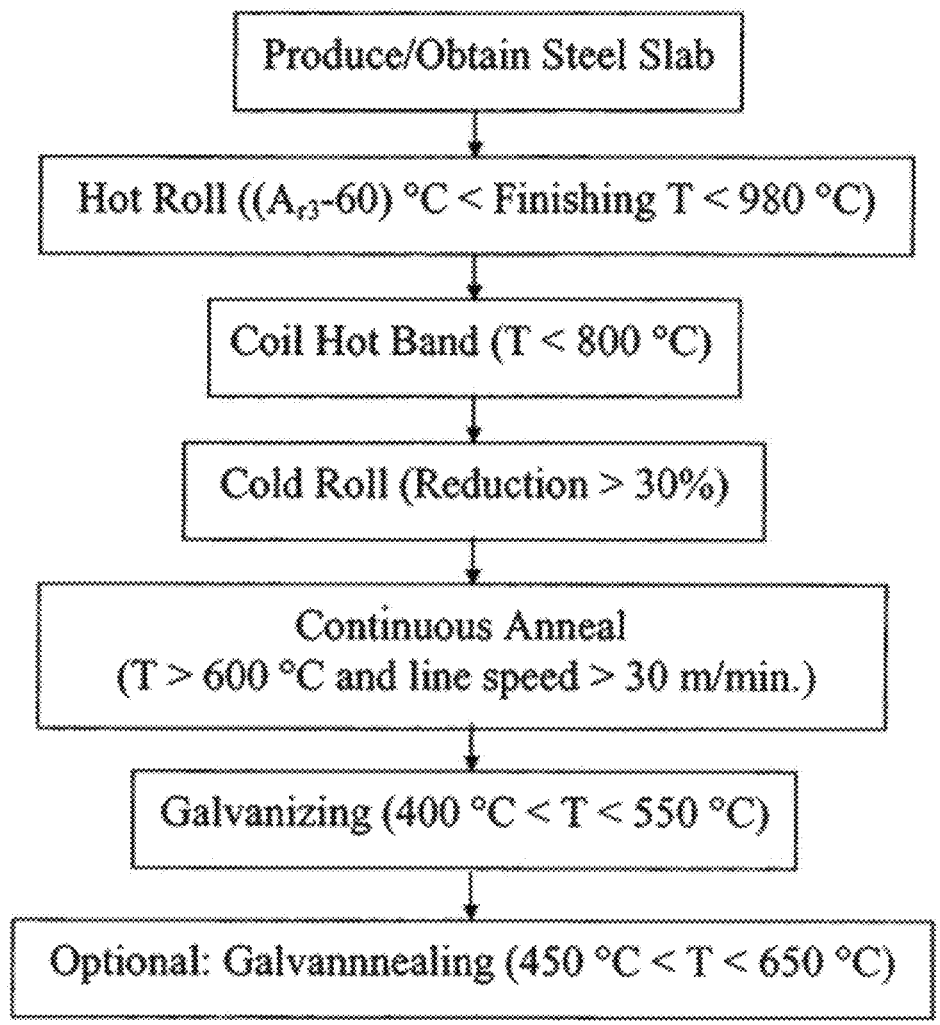
FIG. 2 is a schematic process flow diagram which illustrates the preferred process steps of the present invention.

FIG. 2 depicts a schematic process flow diagram, which illustrates the basic process steps of an embodiment of the present invention.

The compositions of the steel sheet disclosed in the present invention facilitate the manufacture of hot dip coated high strength dual phase-structured steel sheet using robust processing conditions. Thus, a steel sheet with minimal variations in material properties can be obtained within a much wider range of annealing temperature and line speed than sheet made using prior art processes, as further illustrated by the Examples below.

EXAMPLES

In the course of developing the present invention, several types of low carbon molten steels were made using an Electric Arc Furnace and were then formed into thin steel slabs with a thickness of about 53 mm at the Nucor-Berkeley Compact Strip Production Plant, located in Huger, S.C. (United States of America).

Compositions of Various Steels

The concentrations of the major chemical elements of several steels are presented in TABLE 1 below. Among these materials, steels A, C, D, E and G were manufactured according to the present invention (Pres. Inv.); all chemical elements of these steels, including those elements not shown in TABLE 1, were therefore limited to the ranges specified by the present invention. Steels B and F were comparative examples (Comp. Ex.), manufactured using some of the methods disclosed in the above discussed prior art US patents and/or US published patent applications.

TABLE 1

(STEEL COMPOSITION)

| Element (%) | A (Pres. Inv.) | B (Comp. Ex.) | C (Pres. Inv.) | D (Pres. Inv.) | E (Pres. Inv.) | F (Comp. Ex.) | G (Pres. Inv.) |
|---|---|---|---|---|---|---|---|
| C (%) | 0.050 | 0.204 | 0.044 | 0.044 | 0.045 | 0.055 | 0.060 |
| Mn (%) | 0.593 | 0.529 | 1.550 | 1.472 | 1.596 | 0.972 | 1.576 |
| Si (%) | 0.169 | 0.005 | 0.198 | 0.177 | 0.200 | 0.035 | 0.731 |
| Al (%) | 0.038 | 0.021 | 0.044 | 0.060 | 0.042 | 0.038 | 0.050 |
| Mo (%) | 0.014 | 0.014 | 0.019 | 0.125 | 0.128 | 0.291 | 0.201 |
| B (%) | 0.0003 | 0.0003 | 0.0001 | 0.0001 | 0.0007 | 0.0035 | 0.0002 |
| N (%) | 0.0073 | 0.0069 | 0.0083 | 0.0075 | 0.0097 | 0.0071 | 0.0094 |
| Ca (%) | 0.003 | 0.002 | 0.002 | 0.002 | 0.004 | 0.001 | 0.002 |
| Cr + Ni (%) | 0.56 | 0.07 | 1.05 | 0.74 | 0.81 | 0.06 | 0.75 |
| Nb + Ti + V (%) | 0.017 | 0.010 | 0.027 | 0.025 | 0.024 | 0.055 | 0.051 |

More specifically, each of the steel slabs was hot rolled to form respective hot bands using hot rolling termination temperatures (also known as finishing exit temperatures) ranging from $(A_{r3}-20)°$ C. to 920° C. (1688° F.). Immediately after completing hot rolling, the hot rolled steel sheets were water cooled at a conventional runout table using cooling rates faster than 10° C./s (18° F./s) down to the coiling temperatures ranging from 450° C. (842° F.) to 650° C. (1202° F.), and then were coiled at the corresponding temperatures.

After hot rolling and coiling, the hot bands were pickled to improve surface quality and then cold rolled to obtain the final thickness of the cold rolled steel sheets ranging from 1.0 mm to 2.0 mm. The cold rolling step was performed at a conventional reversing cold mill using total cold reduction of greater than 50%.

Then, the cold rolled steel sheets were hot dip galvanized and galvannealed at a continuous hot dip galvanizing line. Each of the employed heating temperature and soaking temperature ranged between 700° C. (1292° F.) and 900° C. (1652° F.), with a line speed ranging from 50 m/min to 100 m/min. The temperature in the galvanizing bath (also known as a zinc alloy pot) was set in a range between 450° C. (842° F.) and 480° C. (896° F.), while the galvannealing temperature (also known as the alloying treatment temperature) was set in a range between 500° C. (932° F.) and 580° C. (1076° F.).

Surface Quality of Various Steels

Subsequently, the coated steel sheets were tension leveled and skin passed, using a total elongation or extension of not more than 1.0%. Very good surface appearance was observed on all of the resulting hot dip coated steel sheets manufactured according to the present invention.

Material Properties of Various Steels

Full thickness test pieces were taken from the coated steel sheets along the hot rolling direction, and then the test pieces were machined into tensile specimens. Those specimens with a final thickness of 1.5 mm were tested. The tensile testing was conducted on the specimens using an Instron 5567 Table Mounted Testing System with a capacity of 30 kN (6750 lb), equipped with Merlin Software.

Material properties of the final thickness specimens, including the yield strength, the tensile strength, the total elongation, and the n-value were measured in accordance with the standard ASTM A370 method.

More specifically, the yield strength was determined on the specimens at an offset strain of 0.2%. The n-value (the strain hardening exponent) was determined by the slope of the "best fit line" between 10% and 20% strain, in accordance with ASTM E646.

The results of the material properties measurements for the steel sheet specimens with a final thickness of 1.5 mm are presented below in TABLES 2, 3 and 4. TABLE 2 includes the data for steels A and B, each of which has a specified tensile strength of at least 440 MPa; TABLE 3 includes the data for steels C, D, E and F, each of which has a specified tensile strength of at least 590 MPa; and TABLE 4 includes the data for steel G, which has a specified tensile strength of at least 780 MPa.

TABLE 2

(TENSILE STRENGTH SPECIFICATION ≥440 MPa)

| | Steel Sample | |
|---|---|---|
| Material Properties | A Present Invention | B Comparative Example |
| Tensile Strength (MPa) | 462 | 475 |
| Yield Strength (MPa) | 321 | 408 |
| Total Elongation (%) | 35 | 30 |
| Yield/Tensile Ratio (%) | 69.5 | 85.9 |
| n-value (10-20%) | 0.202 | 0.190 |

TABLE 3

(TENSILE STRENGTH SPECIFICATION ≥590 MPa)

| | Steel Sample | | | |
|---|---|---|---|---|
| Material Properties | C Present Invention | D Present Invention | E Present Invention | F Comparative Example |
| Tensile Strength (MPa) | 633 | 625 | 636 | 632 |
| Yield Strength (MPa) | 402 | 385 | 389 | 553 |
| Total Elongation (%) | 24 | 29 | 25 | 15 |
| Yield/Tensile Ratio (%) | 63.5 | 61.6 | 61.2 | 87.5 |
| n-value (10-20%) | 0.169 | 0.178 | 0.169 | 0.100 |

TABLE 4

(TENSILE STRENGTH SPECIFICATION ≥780 MPa)

| | Steel Sample G |
|---|---|
| Material Properties | Present Invention |
| Tensile Strength (MPa) | 811 |
| Yield Strength (MPa) | 548 |
| Total Elongation (%) | 21 |
| Yield/Tensile Ratio (%) | 67.6 |
| n-value (10-20%) | 0.148 |

All of the material property characteristics presented in the above TABLES 2, 3, and 4 confirm that the formability of the hot dip coated dual phase steel sheets manufactured by the present invention was superior to the formability of those steel sheets produced by prior art methods.

More particularly, as can be seen from the data presented in TABLE 2, steel A, which was manufactured according to the present invention, exhibited much lower yield strength, much higher total elongation, much lower yield/tensile ratio and much higher n-value than the corresponding properties for steel B, which was a comparative sample produced with a conventional method, even though the tensile strength of steel A was very close to the tensile strength of steel B. These property comparisons demonstrate that the formability of steel A was much higher than the formability of steel B.

Observations similar to those for the data presented in TABLE 2 can also be made for the data presented in TABLE 3, where for steels C, D and E, which were manufactured according to the present invention, the yield strength and yield/tensile ratio were markedly lower and the total elongation and n-value were significantly higher than the corresponding properties of steel F, which was a comparative sample made using a prior art method, even though each of steels C, D, E, and F had similar tensile strength. These property comparisons demonstrate that the formability of each of steels C, D, and E was much higher than the formability of steel F.

TABLE 4 also illustrates excellent formability for steel G, which was manufactured according to the present invention to achieve a much higher tensile strength of above 780 MPa. Material Properties of Various Steels at Various Annealing Temperatures and Various Line Speeds As stated above, the composition of the dual phase steel sheet established in the present invention is set to ensure excellent and stabilized material properties regardless of variations in processing conditions.

In order to demonstrate this distinctive feature of the present invention, 4 steel samples, each having the composition of steel E according to the present invention (see, TABLE 1), were manufactured in accordance with the method of the present invention, using various hot dip coating processing conditions, namely 4 different annealing temperatures (the temperature in the soaking zone of the galvanizing line) and 4 different line speeds. Additionally, 4 steel samples, each having the composition of steel F according to the prior art (see, TABLE 1), were manufactured in accordance with the hot dip coating method of the prior art, and also using 4 different annealing temperatures (the temperature in the soaking zone of the galvanizing line) and 4 different line speeds.

The material properties of the 4 samples having the composition of inventive steel E and the material properties of the 4 samples having the composition of comparison steel F were tested, and the results are summarized in TABLE 5 below.

TABLE 5

(TENSILE STRENGTH SPECIFICATION ≥ 590 MPa)

| Processing Conditions/ Material Properties | Steel Sample E Present Invention | | | | | F Comparative Example | | |
|---|---|---|---|---|---|---|---|---|
| Annealing Temperature (soaking zone of galvanizing line) (° C.) | 777 | 816 | 823 | 824 | 810 | 852 | 852 | 866 |
| Line Speed (galvanizing) (m/min.) | 76.2 | 76.2 | 68.6 | 79.9 | 70.1 | 51.8 | 54.9 | 54.9 |
| Tensile Strength (MPa) | 688 | 670 | 636 | 620 | 504 | 504 | 634 | 632 |
| Yield Strength (MPa) | 428 | 416 | 389 | 388 | 355 | 396 | 552 | 553 |
| Total Elongation (%) | 24 | 24 | 25 | 25 | 25 | 25 | 15 | 15 |
| Yield/Tensile Ratio (%) | 62.2 | 62.1 | 61.2 | 62.6 | 70.4 | 78.6 | 87.1 | 87.5 |
| n-value (10-20%) | 0.169 | 0.165 | 0.169 | 0.170 | 0.163 | 0.163 | 0.085 | 0.100 |

The data in TABLE 5 illustrate that the material properties of the 4 samples of steel E (present invention) were very stable within a wide range of processing conditions (annealing temperatures and line speeds). More particularly, the actual tensile strength met the specified value of ≥590 MPa; the yield strength just slightly varied from 388 to 428 MPa; the yield/tensile ratio just slightly varied from 61.2% to 62.6%; the total elongation just slightly varied from 24% to 25%; and the n-value just slightly varied from 0.165 to 0.170.

On the other hand, as can be seen from the data in TABLE 5, the material properties of the 4 samples of steel F (comparison example) changed markedly as the processing conditions (annealing temperatures and line speeds) changed. For instance, the actual tensile strength of each of the first and second samples of steel F was only 504 MPa and thus failed to meet the specification of ≥590 MPa. Also, for all of the samples of steel F, the yield strength varied notably from 355 to 553 MPA; the yield/tensile ratio varied notably from 70.4% to 87.5%; the total elongation varied notably from 15% to 25%; and the n-value varied notably from 0.085 to 0.163.

Accordingly, the examples set out in TABLE 5 illustrate that the compositions of steel sheets developed according to the present invention facilitated the manufacture of hot dip coated dual phase-structured steel sheet using robust processing conditions, which is clearly a manufacturing advantage over the prior art methods for commercially producing hot dip coated dual phase steel sheets.

The yield/tensile ratio is widely recognized as an important property parameter characterizing the formability of dual phase steel sheets. The lower that the value of this parameter is, then the better that the formability of the steel sheet is.

As presented in all TABLES above, the measured values of the yield/tensile ratio, regardless of the tensile strength level associated with the inventive steel sheets, were under 70%. More particularly, the values were under 65% for most steel sheets that were manufactured in accordance with the present invention. These values under 70% for the inventive steel sheets were clearly lower than the yield/tensile ratio values from 70.4% to 87.5% measured for the comparative steel sheets that were produced according to prior art methods. Thus, these results demonstrate a formability for the presently invented dual phase, hot dip coated steel sheets much better than the formability of the comparison dual phase, hot dip coated steel sheets.

Forming of Various Steels into Parts

Additionally to illustrate the excellent formability of the steel sheets of the present invention, several inventive samples of hot dip galvannealed dual phase steel sheets and several commercially available hot dip galvannealed dual phase steel sheets were stamped into various parts in a stamping plant. All of the steel sheets manufactured in accordance with the present invention were successfully formed into the desired parts without any difficulty, whereas the commercial dual phase steel sheets encountered a few forming problems during the stamping process to make the same kinds of parts.

Impact Toughness and Crashworthiness of Various Steels

Compared to the prior art dual phase steels, the steel sheets of the present invention have excellent impact toughness and crashworthiness, as evidenced by the inventive steel sheets having an impact energy≥about 1200 g-m, more particularly≥about 1300 g-m, and even more particularly-≥about 1400 g-m. Each impact energy measurement was taken on a V-notch Charpy specimen of about 1.5 mm thickness.

More specifically, in order to evaluate the impact toughness and crashworthiness of the presently invented hot dip coated dual phase steel sheets versus comparison hot dip coated dual phase steel sheets, a number of V-notch Charpy specimens were machined and prepared according to ASTM E23-05, from as-coated steel sheets having a thickness of 1.5 mm. These specimens were then tested for the material property of the mean impact energy at ambient temperature using a S1-1 K3 Pendulum Impact Machine. During testing, a 407 J (300 ft-lb) Charpy pendulum with a length of 800 mm was used at an impact velocity of 5.18 m/s (17 ft/s). The material property of the various mean impact energies determined for steels A, B, C, D, E and F are presented below in TABLE 6.

TABLE 6

| | Steel Sample (thickness = 1.5 mm) | | | | | |
|---|---|---|---|---|---|---|
| Material Property | A (Pres. Inv.) | B (Comp. Ex.) | C (Pres. Inv.) | D (Pres. Inv.) | E (Pres. Inv.) | F (Comp. Ex.) |
| Tensile Strength Specification (MPa) | ≥440 | ≥440 | ≥590 | ≥590 | ≥590 | ≥590 |
| Impact Energy (g-m) | 1518 | 1106 | 1631 | 1607 | 1568 | 1044 |

As indicated in TABLE 6, the impact energies for steels A, C, D and E, manufactured in accordance with the present invention, were notably higher than the impact energies for comparative steels B and E. These results therefore illustrate that the presently invented hot dip coated dual phase steel sheets possess much better impact toughness and crash resistance than conventional hot dip coated dual phase steel sheets produced by prior art methods.

Self Weldability and Weldability to Other Steels (Bulk Electrical Resistiviity)

In order to evaluate self weldability, self welded samples of hot dip coated dual phase steel sheets, manufactured in accordance with the present invention and having a specified tensile strength of ≥590 MPa, were compared with several self welded samples of commercially available hot dip coated dual phase steel sheets, manufactured using several prior methods and having a specified tensile strength of ≥590 MPa.

More specifically, a number of rectangular steel samples with a dimension of 38.1 mm by 254 mm were cut from the commercial steel sheets as well as from the presently invented steel sheets. Like steel samples were spot welded together, using an AC welding machine having a truncated class 2 electrode with 6.4 mm face diameter, with a constant tip force of 400 kg and a 20 cycles holding time throughout the welding testing. The total welding time employed varied from 15 to 25 cycles, and welding current varied from 7 to 15 kA. The minimum button size (weld nugget) was decided using the four times square root of thickness rule.

After the resistance spot welding, peel tests were conducted on all spot welded samples. More particularly, the resistance spot welds were cross-sectioned and examined to evaluate the profile and soundness of the weld nugget.

Of the spot welded samples taken from the presently invented hot dip coated steel sheets, all the weld nuggets were observed to be free of shrinkage voids and micro cracks within the welding time and current range employed during testing. However, for some of the weld nuggets of the spot welded samples taken from the commercial hot dip coated dual phase steel sheets, shrinkage voids and micro cracks were observed varying from 5 to 40% depending on the steel manufacturers.

These testing results thus support the observation that the self weldability of the hot dip coated dual phase steel sheets manufactured in accordance with the present invention is superior to the self weldability associated with the hot dip coated dual phase steel sheets produced using the prior art methods.

Subsequently, in order to evaluate weldability to different types of steels, bulk electrical resistivity was measured using a digital low resistance ohmmeter at ambient temperature on the above hot dip coated dual phase steel sheets (both those of the present invention and those commercially available in the prior art), as well as being measured on some other types of commercially available steel sheets.

A value of 21.4 μΩ-cm was obtained for the mean bulk electrical resistivity of the presently invented hot dip coated dual phase steel sheets, while this property ranged from 22.2 to 35.8 μΩ-cm for the commercial hot dip coated dual phase steel sheets. The mean bulk electrical resistivity determined for a number of other types of commercial hot dip coated steel sheets, such as hot dip coated carbon and high strength low alloy steel sheets, resulted in lower values ranging from 1.2 to 1.9 μΩ-cm.

As is known in the art of steel welding, the smaller that the difference in bulk electrical resistivity is between two different types of steel sheets, then, the more weldable these two different types of steel sheets are when joined together by means of resistance spot welding. Since the difference in bulk electrical resistivity between the other types of commercial hot dip coated steel sheets (such as hot dip coated carbon and high strength low alloy steel sheets) and the presently invented hot dip coated dual phase steel sheets is much smaller than the difference between the other types of commercial hot dip coated steel sheets (such as hot dip coated carbon and high strength low alloy steel sheets) and the prior art hot dip coated dual phase steel sheets, the results indicate that the presently invented hot dip coated dual phase steel sheets are not only very self weldable, but also much more weldable to other types of commercial steel sheets than are the prior art hot dip coated dual phase steel sheets.

These advantages in weldability of the presently invented hot dip coated dual phase steel to different types of steel should greatly help to expand the applications of the presently invented dual phase steel sheets, especially when different parts made from various types of steel sheets are to be joined together for an end use.

Although the present invention has been shown and described in detail with regard to only a few exemplary embodiments of the invention, it should be understood by those skilled in the art that it is not intended to limit the invention to specific embodiments disclosed. Various modifications, omissions, and additions may be made to the disclosed embodiments without materially departing from the novel teachings and advantages of the invention, particularly in light of the foregoing teachings. Accordingly, it is intended to cover all such modifications, omissions, additions, and equivalents as may be included within the spirit and scope of the invention as defined by the following claims.

What is claimed is:

1. A cold rolled galvanized steel sheet comprising:
   (a) a dual phase microstructure of a ferrite phase and a martensite phase of martensite islands uniformly distributed in the ferrite phase,
   (b) the dual phase microstructure composition consisting of:
   carbon in a range from about 0.01% by weight to about 0.18% by weight,
   manganese in a range from about 0.2% by weight to about 3% by weight,
   silicon≤about 1.2% by weight,
   aluminum in a range from about 0.01% by weight to about 0.1% by weight,
   chromium in combination with nickel in a range from about 0.1% by weight to about 3.5% by weight,
   calcium in a range from about 0.0003% by weight to about 0.01% by weight,
   sulfur≤about 0.03% by weight,
   nitrogen≤about 0.02% by weight, molybdenum≤about 1% by weight,
niobium in combination with titanium, where titanium and niobium are present, the combination present in an amount from >0% by weight to≤about 1% by weight, and
boron≤about 0.006% by weight,
the composition having no purposeful addition of phosphorus, copper and vanadium,
a balance of iron and incidental ingredients; and
(c) wherein the cold rolled galvanized sheet has a volume percent amount of the martensite phase in the dual phase microstructure that provides a tensile strength of at least 780 MPa and (i) impact toughness and crashworthiness as defined by an impact energy≥about 1200 g-m, measured on a V-notch Charpy specimen of about 1.5 mm thickness, and (ii) a yield strength/tensile strength ratio≤about 70%.

2. The cold rolled galvanized steel sheet according to claim 1, wherein:
the carbon ranges from about 0.02% by weight to about 0.12% by weight,
the manganese ranges from about 0.3% by weight to about 2.8% by weight,
the silicon≤about 1% by weight,
the aluminum ranges from about 0.015% by weight to about 0.09% by weight,
the chromium in combination with nickel ranges from about 0.2% by weight to about 3% by weight,
the calcium ranges from about 0.0005% by weight to about 0.009% by weight,
the sulfur≤about 0.02% by weight,
the nitrogen≤about 0.015% by weight,
the molybdenum≤about 0.8% by weight,
the niobium in combination with titanium, where titanium and niobium are present, the combination present in a range from >0% by weight to≤about 0.8% by weight, and
the boron≤about 0.003% by weight
wherein the steel sheet has properties of (i) a yield strength/tensile strength ratio≤about 70%, (ii) impact toughness and crashworthiness as defined by an impact energy≥about 1200 g-m, measured on a V-notch Charpy specimen of about 1.5 mm thickness, (iii) an elongation≥about 20% in accordance with ASTM A370 method, (iv) a tensile strength greater than or equal to 780 MPa and self-weldable and weldable with other types of steel.

3. A cold rolled galvanized steel sheet comprising:
(a) a dual phase microstructure of a ferrite phase and a martensite phase of martensite islands uniformly distributed in the ferrite phase, wherein the martensite phase comprises from about 11% by volume to about 35% by volume of the dual phase microstructure;
(b) the dual phase microstructure composition comprising:
carbon in a range from about 0.02% by weight to about 0.12% by weight,
manganese in a range from about 0.3% by weight to about 2.8% by weight,
silicon≤about 1% by weight,
aluminum in a range from about 0.015% by weight to about 0.09% by weight,
chromium in combination with nickel in a range from greater than 0.5% by weight to about 3% by weight,
calcium in a range from about 0.0005% by weight to about 0.009% by weight,
sulfur≤about 0.02% by weight,
nitrogen≤about 0.015% by weight,
molybdenum≤about 0.8% by weight,
niobium in combination with titanium is the combination present in an amount of from >0% by weight to ≤about 0.8% by weight, and
boron≤about 0.003% by weight,
the composition having no purposeful addition of phosphorus, copper and vanadium,
a balance of iron and incidental ingredients; and
(c) properties after cold rolling and galvanizing of (i) a yield strength/tensile strength ratio about 70%, (ii) an elongation≥about 20% in accordance with ASTM A370 method, (iii) a tensile strength greater than or equal to 590 and up to 811 MPa; and (iv) impact toughness and crashworthiness as defined by an impact energy≥about 1200 g-m, measured on a V-notch Charpy specimen of about 1.5 mm thickness.

4. A cold rolled galvanized and galvannealed steel sheet comprising:
(a) a dual phase microstructure of a ferrite phase and a martensite phase of martensite islands uniformly distributed in the ferrite phase;
(b) the dual phase microstructure composition comprising:
carbon in a range from about 0.01% by weight to about 0.12% by weight,
manganese in a range from about 0.2% by weight to about 3% by weight,
silicon≤about 1.2% by weight,
aluminum in a range from about 0.01% by weight to about 0.1% by weight,
a chromium in combination with nickel in a range from about 0.2% by weight to about 3% by weight,
calcium in a range from about 0.0003% by weight to about 0.01% by weight,
sulfur≤about 0.03% by weight,
nitrogen≤about 0.02% by weight,
molybdenum≤about 1% by weight,
niobium in combination with titanium whereby both elements are present in sum from >0% by weight to ≤about 1% by weight, and
boron≤about 0.006% by weight,
the composition having no purposeful addition of phosphorus, copper and vanadium,
a balance of iron and incidental ingredients; and
(c) wherein the cold rolled galvanized and galvannealed sheet has a volume percent amount of the martensite phase in the dual phase microstructure that is self-weldable and weldable with other types of steel and weldable with other types of steel, and
wherein the steel sheet has properties of (i) a yield strength/tensile strength ratio≤about 70, (ii) an impact energy≥about 1200 g-m, measured on a V-notch Charpy specimen of about 1.5 mm thickness, (iii) an elongation≥about 20% and (iv) a tensile strength greater than or equal to 780 MPa.

5. A cold rolled galvanized and galvannealed steel sheet comprising:
(a) a dual phase microstructure of a ferrite phase and a martensite phase of martensite islands uniformly distributed in the ferrite phase, wherein the martensite phase comprises from about 11% by volume to about 35% by volume of the dual phase microstructure;

(b) the dual phase microstructure composition comprising:
carbon in a range from about 0.02% by weight to about 0.12% by weight,
manganese in a range from about 0.3% by weight to about 2.8% by weight,
silicon≤about 1% by weight,
aluminum in a range from about 0.015% by weight to about 0.09% by weight,
chromium in combination with nickel whereby both elements are present in sum in a range from greater than 0.5% by weight to about 3% by weight,
calcium in a range from about 0.0005% by weight to about 0.009% by weight,
sulfur≤about 0.02% by weight,
nitrogen≤about 0.015% by weight,
molybdenum≤about 0.8% by weight,
niobium in combination with titanium, whereby both elements are present in sum from >0% by weight to≤about 0.8% by weight, and
boron≤about 0.003% by weight,
the composition having no purposeful addition of phosphorus, copper and vanadium,
a balance of iron and incidental ingredients; and
(c) properties after cold rolling and galvanizing and galvannealing of (i) a yield strength/tensile strength ratio≤about 70%, (ii) impact toughness and crashworthiness as defined by an impact energy≥about 1200 g-m, measured on a V-notch Charpy specimen of about 1.5 mm thickness, (iii) an elongation≥about 20%, (iv) a tensile strength greater than or equal to 590 and up to 811 MPa; and (v) an n-value greater than or equal to 0.148 when the tensile strength is greater than or equal to 590 MPa.

* * * * *